(12) United States Patent
Shirai et al.

(10) Patent No.: US 12,175,779 B2
(45) Date of Patent: Dec. 24, 2024

(54) INFORMATION PROCESSING DEVICE AND INFORMATION PROCESSING METHOD TO EVALUATE A PERSON IN CHARGE OF LABELING

(71) Applicant: SONY CORPORATION, Tokyo (JP)

(72) Inventors: Mizuki Shirai, Chiba (JP); Yoshihiro Wakita, Tokyo (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1089 days.

(21) Appl. No.: 17/040,027

(22) PCT Filed: Dec. 21, 2018

(86) PCT No.: PCT/JP2018/047313
§ 371 (c)(1),
(2) Date: Sep. 21, 2020

(87) PCT Pub. No.: WO2019/187421
PCT Pub. Date: Oct. 3, 2019

(65) Prior Publication Data
US 2021/0019656 A1 Jan. 21, 2021

(30) Foreign Application Priority Data
Mar. 29, 2018 (JP) .................. 2018-063868

(51) Int. Cl.
*G06V 20/70* (2022.01)
*G06F 18/21* (2023.01)
(Continued)

(52) U.S. Cl.
CPC ............ *G06V 20/70* (2022.01); *G06F 18/211* (2023.01); *G06F 18/214* (2023.01);
(Continued)

(58) Field of Classification Search
None
See application file for complete search history.

(56) References Cited

U.S. PATENT DOCUMENTS 7,725,414 B2 * 5/2010 Nigam .................... G06F 16/35
706/62
9,053,358 B2 * 6/2015 Yokono ................ G06F 18/231
(Continued)

FOREIGN PATENT DOCUMENTS

CN 102867025 A 1/2013
CN 104133769 A 11/2014
(Continued)

OTHER PUBLICATIONS

Yoshisaku et al, "An Active-Learning-Based Annotation Tool for Activity Recognition Systems", IPSJ SIG Technical Report, vol. 2011-UBI-31 No. 3, Jul. 14, 2011, p. 1-8.

(Continued)

*Primary Examiner* — Maikhanh Nguyen
(74) *Attorney, Agent, or Firm* — CHIP LAW GROUP

(57) ABSTRACT

Provided is an information processing device including a control unit that performs: temporary label addition processing of adding a temporary label to a predetermined position on input data for machine learning; processing of generating label data in accordance with input of correction of the temporary label by a person in charge of labeling; and processing of comparing label data corrected by the person in charge of labeling with correct-answer label data that is acquired in advance, and calculating labeling accuracy of the person in charge of labeling.

9 Claims, 27 Drawing Sheets

(51) Int. Cl.
   *G06F 18/211*   (2023.01)
   *G06F 18/214*   (2023.01)
   *G06N 20/00*    (2019.01)
   *G06V 10/771*   (2022.01)
   *G06V 10/774*   (2022.01)

(52) U.S. Cl.
   CPC ......... *G06F 18/2178* (2023.01); *G06N 20/00* (2019.01); *G06V 10/771* (2022.01); *G06V 10/774* (2022.01)

(56) References Cited

U.S. PATENT DOCUMENTS

| | | | | |
|---|---|---|---|---|
| 2005/0210065 | A1* | 9/2005 | Nigam | G06F 16/35 |
| 2012/0117096 | A1* | 5/2012 | Massand | G06F 16/14 |
| | | | | 707/758 |
| 2012/0300980 | A1* | 11/2012 | Yokono | G06V 40/113 |
| | | | | 382/103 |
| 2013/0091161 | A1* | 4/2013 | McCarley | G06F 40/51 |
| | | | | 707/769 |
| 2014/0359421 | A1* | 12/2014 | Allen | G06F 40/169 |
| | | | | 715/230 |
| 2015/0254223 | A1 | 9/2015 | Sakaki et al. | |
| 2019/0042953 | A1* | 2/2019 | Duesterwald | G06F 18/214 |
| 2020/0167671 | A1* | 5/2020 | Okada | G06F 17/18 |

FOREIGN PATENT DOCUMENTS

| | | |
|---|---|---|
| CN | 105608318 A | 5/2016 |
| CN | 106156025 A | 11/2016 |
| CN | 107705034 A | 2/2018 |
| JP | 2009-110064 A | 5/2009 |
| JP | 2015-087903 A | 5/2015 |
| JP | 2015-166975 A | 9/2015 |
| JP | 2017-194782 A | 10/2017 |

OTHER PUBLICATIONS

International Search Report and Written Opinion of PCT Application No. PCT/JP2018/047313, issued on Mar. 26, 2019, 11 pages of ISRWO.

Kashima, et al., "Crowdsourcing and Machine Learning", Journal of Japanese Society for Artificial Intelligence, vol. 27, No. 4, 2012, pp. 381-388.

Yoshisaku, et al., "ALATA : An Active-Learning-based Annotation tool for Activity Recognition System", IPSJ Sig Technical Report, vol. 11, No. 134, 2011, pp. 17-24.

* cited by examiner

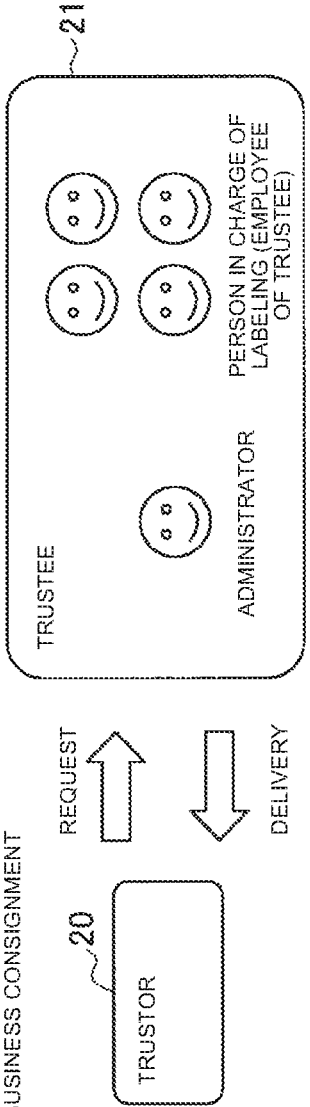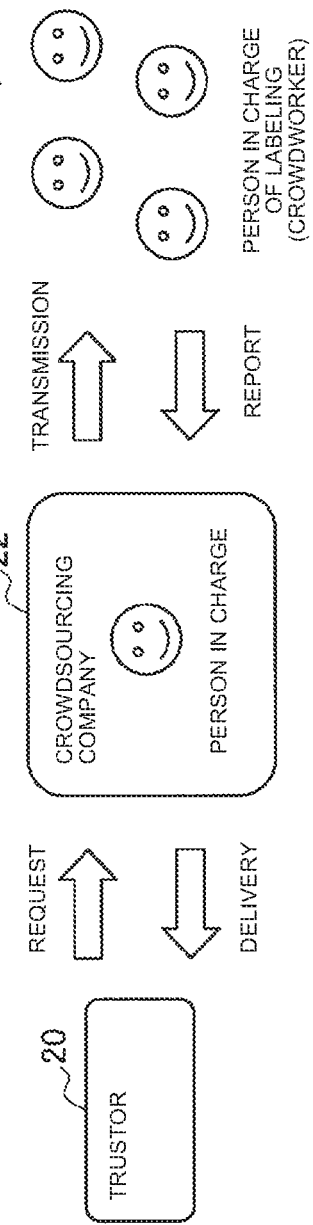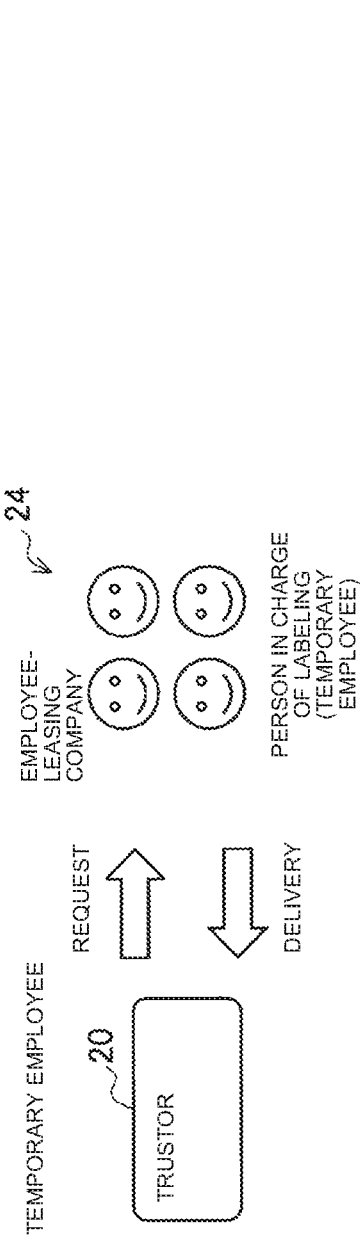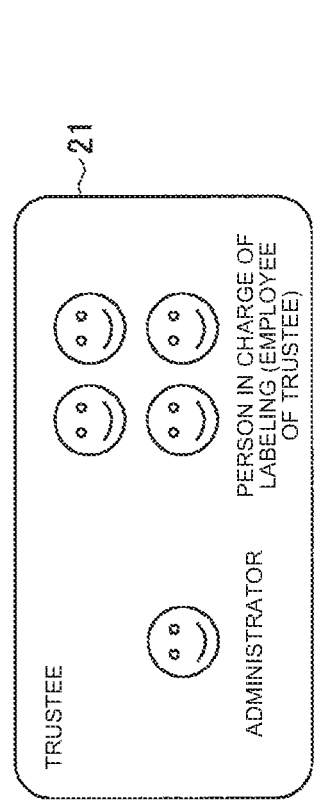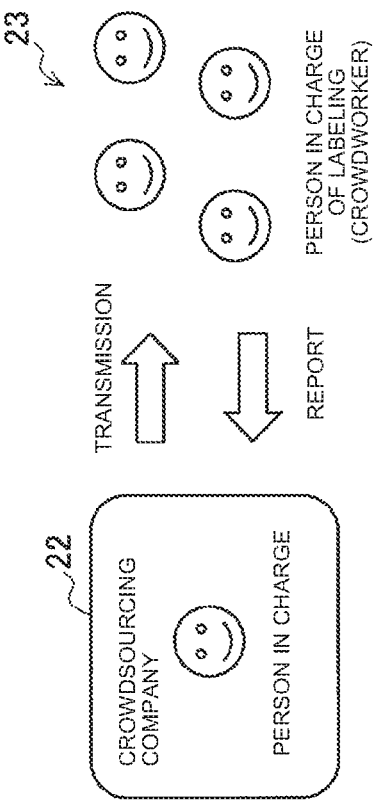
FIG.4

FIG.16
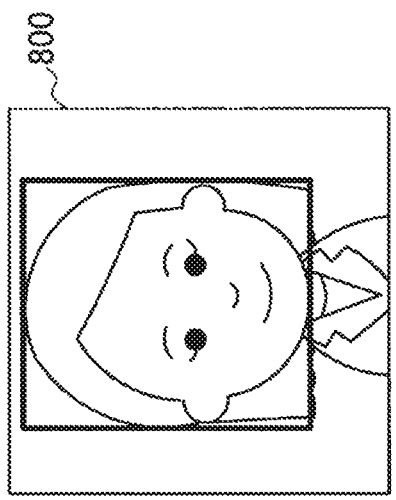
STANDARD:
ENCLOSE RANGE FROM
HEAD TOP PART TO CHIN
VERTICALLY, AND FROM
LEFT EAR TO RIGHT EAR
HORIZONTALLY IN
RECTANGLE
BULGING PART OF HAIR OR
HAIR ORNAMENT SHOULD
BE EXCLUDED
 
NG                    CORRECT ANSWER
 
NG                    CORRECT ANSWER
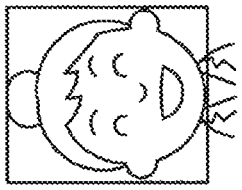 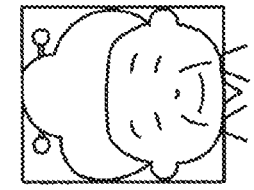
NG                    CORRECT ANSWER

GOOD EXAMPLE: FLUCTUATIONS AND DIFFERENCES ARE SMALL, AND LABELING IS STABLE

UNSUITABLE EXAMPLE: DIFFERENCE FROM CORRECT ANSWER IS LARGE, AND FLUCTUATIONS DEPENDING ON LABELING PERIOD ARE LARGE

INFORMATION PROCESSING DEVICE AND INFORMATION PROCESSING METHOD TO EVALUATE A PERSON IN CHARGE OF LABELING

CROSS REFERENCE TO RELATED APPLICATIONS

This application is a U.S. National Phase of International Patent Application No. PCT/JP2018/047313 filed on Dec. 21, 2018, which claims priority benefit of Japanese Patent Application No. JP 2018-063868 filed in the Japan Patent Office on Mar. 29, 2018. Each of the above-referenced applications is hereby incorporated herein by reference in its entirety.

FIELD

The present disclosure relates to an information processing device, an information processing method, and a computer program.

BACKGROUND

In recent years, Internet of Things (IoT) by which "things" such as various devices and sensors are connected to a cloud via the Internet has become widespread due to development of a communication technique, so that a large amount of data is enabled to be collected from day to day. Accordingly, a demand for machine learning applied to analysis of such a large amount of data has been increasing.

For example, in recent years, there has been developed a technique related to a multilayer neural network that is called deep learning, and the following Patent Literature 1 discloses a mechanism that can perform learning of a neural network more efficiently.

In supervised learning as a method of machine learning, data such as an image, a document, and a voice, and a label and the like indicating content of the data are combined to be used for learning and evaluation. Specifically, a label is assumed to be teacher data, relevance to the data is learned, and evaluation is performed by comparing a result of estimating a label from the data with an actual label. The following Patent Literature 2 discloses a technique of automatically correcting a label of a data set as teacher data to improve quality of the label used for supervised learning.

CITATION LIST

Patent Literature

Patent Literature 1: JP 2017-194782 A
Patent Literature 2: JP 2015-87903 A

SUMMARY

Technical Problem

However, to implement machine learning with high accuracy, a large amount of high-accuracy data is required for learning. A massive amount of data is collected due to development of the communication technique in recent years, and huge time cost and human cost are required for creating a large number of high-accuracy data sets therefrom. Additionally, accuracy of the data may be changed depending on skill of a creator who creates the data sets.

Thus, the present disclosure provides an information processing device, an information processing method, and a computer program that can evaluate a person in charge of labeling based on a process of generating a data set for improving quality of the data set used for machine learning.

Solution to Problem

According to the present disclosure, an information processing device is provided that includes: a control unit configured to add a temporary label to a predetermined position on input data for machine learning, generate label data in accordance with input of correction of the temporary label by a person in charge of labeling, and calculate labeling accuracy of the person in charge of labeling based on a comparison between label data corrected by the person in charge of labeling and correct-answer label data that is acquired in advance.

According to the present disclosure, an information processing method comprising pieces of processing performed by a processor is provided that includes: temporary label addition processing of adding a temporary label to a predetermined position on input data for machine learning; processing of generating label data in accordance with input of correction of the temporary label by a person in charge of labeling; and processing of comparing label data corrected by the person in charge of labeling with correct-answer label data that is acquired in advance, and calculating labeling accuracy of the person in charge of labeling.

According to the present disclosure, a computer program is provided that causes a computer to function as a control unit, the control unit configured to perform: temporary label addition processing of adding a temporary label to a predetermined position on input data for machine learning; processing of generating label data in accordance with input of correction of the temporary label by a person in charge of labeling; and processing of comparing label data corrected by the person in charge of labeling with correct-answer label data that is acquired in advance, and calculating labeling accuracy of the person in charge of labeling.

Advantageous Effects of Invention

As described above, according to the present disclosure, the person in charge of labeling is enabled to be evaluated based on the process of generating the data set for improving quality of the data set used for machine learning.

The effect described above is not necessarily limitative, and any effect disclosed herein or another effect that may be grasped based on the present description may be exhibited in addition to the effect described above, or in place of the effect described above.

BRIEF DESCRIPTION OF DRAWINGS

FIG. 4 is a diagram for explaining a typical workflow of labeling.

FIG. 16 is a diagram for explaining standards of labeling.

DESCRIPTION OF EMBODIMENTS

Figure 1:
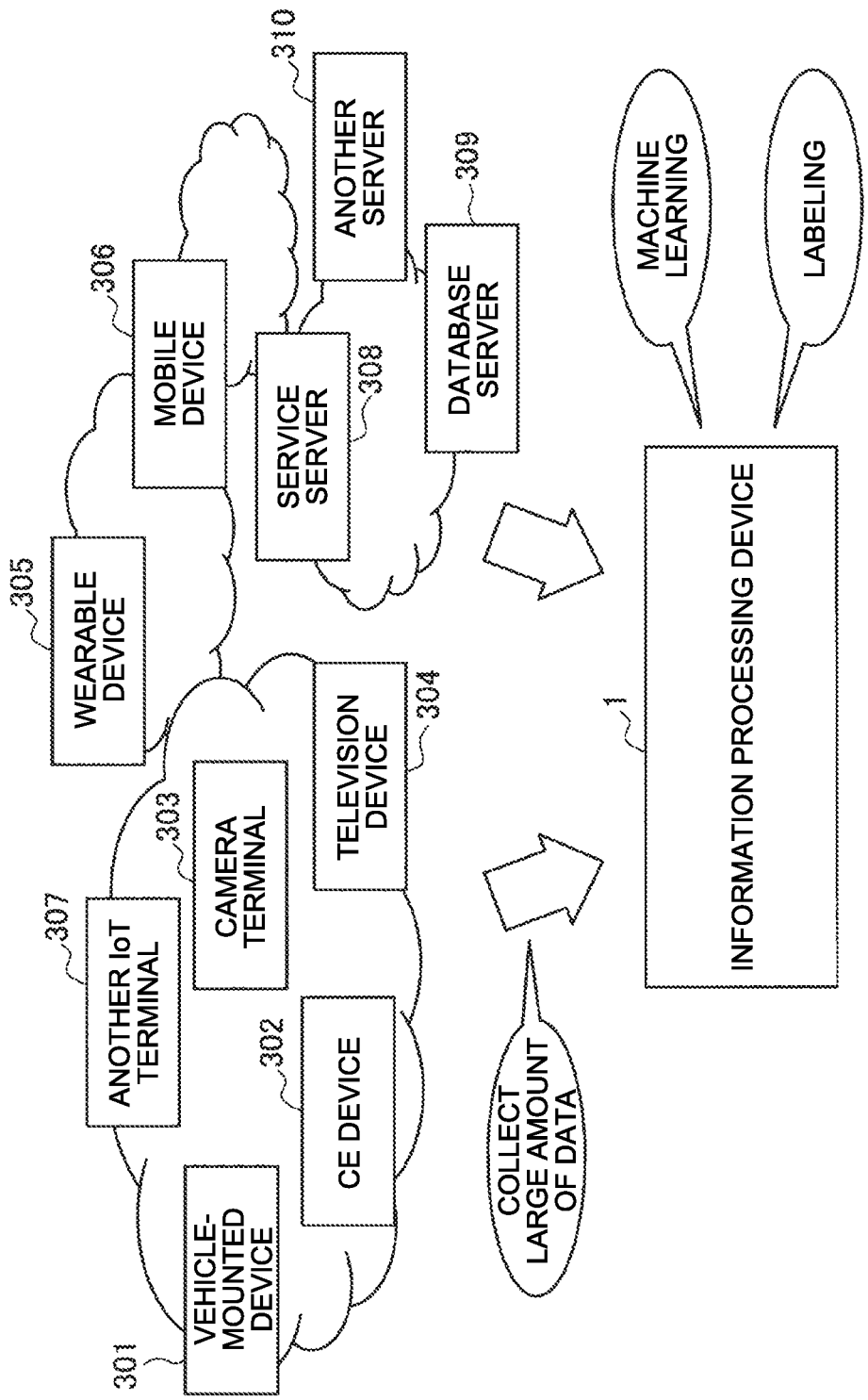
FIG. 1 is a diagram for explaining an outline of an information processing system according to an embodiment of the present disclosure.

The following describes a preferred embodiment of the present disclosure in detail with reference to the attached drawings. Throughout the present description and the drawings, constituent elements having substantially the same functional configuration are denoted by the same reference numeral, and redundant description will not be made.

The description will be made in the following order.
1. Outline of information processing system according to one embodiment of present disclosure
   Specific example of labeling
   Workflow of labeling
   Background
2. Configuration example
3. Operation processing
4. Respective examples
   4-1. Collection of labeling target data
   4-2. Quality improvement of label data
   4-3. Visualization of skill of person in charge of labeling
5. Conclusion

1. OUTLINE OF INFORMATION PROCESSING SYSTEM ACCORDING TO ONE EMBODIMENT OF PRESENT DISCLOSURE

FIG. 1 is a diagram for explaining an outline of an information processing system according to an embodiment of the present disclosure. As illustrated in FIG. 1, an information processing device 1 related to the information processing system according to the present embodiment may collect a large amount of data from various devices, sensors, and the like connected to the Internet (for example, a vehicle-mounted device 301, a CE device 302, a camera terminal 303, a television device 304, a wearable device 305, a mobile device 306, and another IoT terminal 307), or a server and the like on the Internet (for example, a service server 308, a database server 309, and another server 310). The information processing device 1 may perform machine learning based on the large amount of collected data, or creation of a data set (labeling) to be used as teacher data in machine learning.

Typically, "labeling" means adding, to data such as an image, a document, a voice, or a biomedical signal, a label indicating content of the data (marking a predetermined point). Labeled data is referred to as a "data set", and used as teacher data in "supervised learning" as a method of machine learning, for example. As described above, a large amount of teacher data is required to implement high accuracy in machine learning.

A person in charge who performs such work of adding a label (labeling) is referred to as a person in charge of labeling herein. The person in charge of labeling marks a predetermined point on original data such as an image, for example, by using the information processing device 1. An application used for marking may be a commercial application or a self-made tool. A certain standard is required at the time of marking. By unifying the standard, data with higher accuracy can be generated. For example, in a case of marking a "face region" of an image, it is preferable to perform marking on a large amount of data after unifying the standard of a range of the "face region", specifically, the range in a case in which hair is spreading, the range in a case in which a person wears a hat, or the range in a case in which part of a face is shielded. The following describes a specific example of typical labeling.

Specific Example of Labeling

Figure 2:
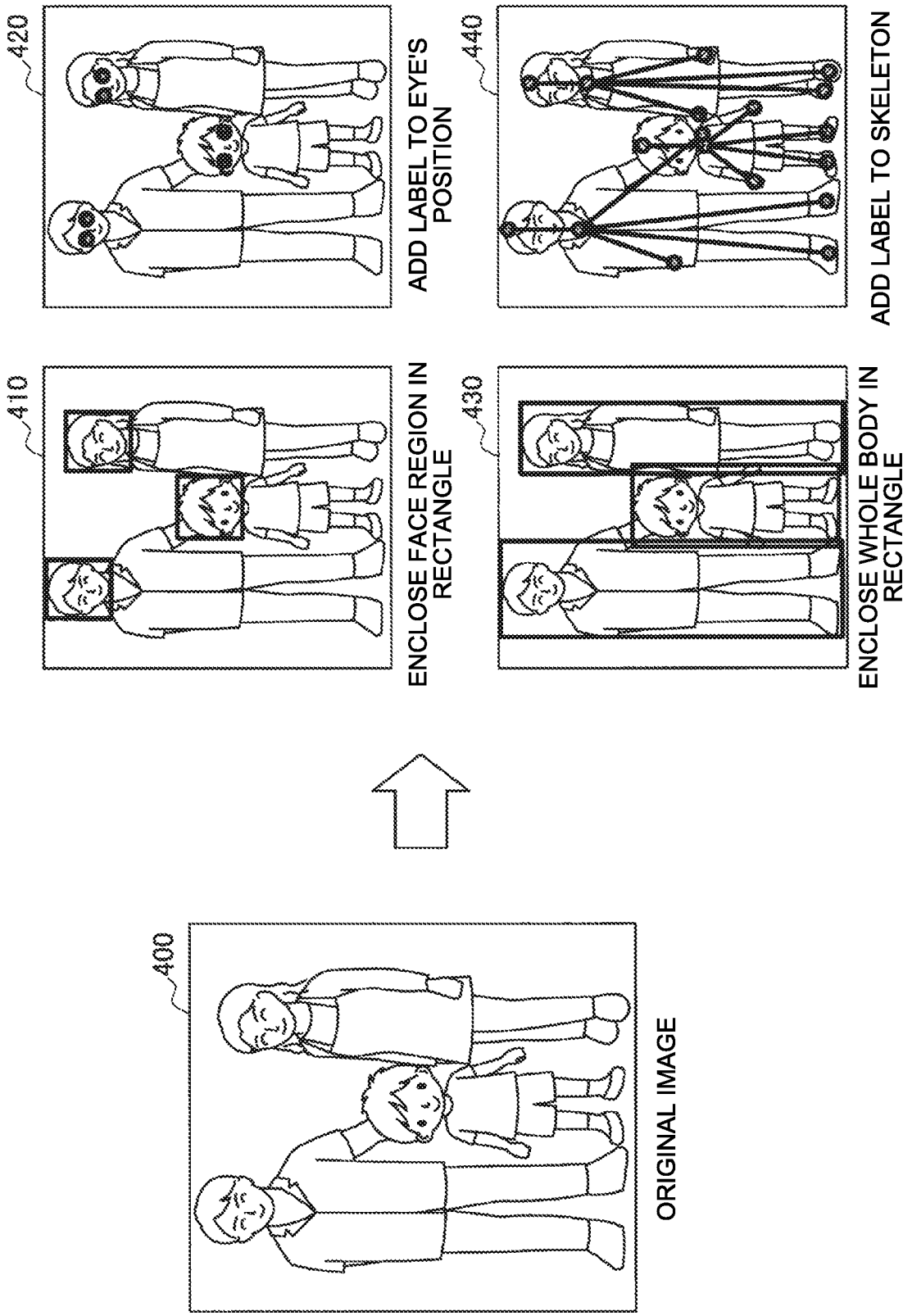
FIG. 2 is a diagram illustrating an example of labeling on an image.

FIG. 2 illustrates an example of labeling on an image. As illustrated in FIG. 2, the example of labeling includes, on an original image 400 reflecting a person, enclosing the face region in a rectangle as represented by an image 410, adding a label to an eye's position as represented by an image 420, enclosing the whole body in a rectangle as represented by an image 430, and adding a label to a skeleton as represented by an image 440, for example.

Other examples include enclosing a hand region in a rectangle, or adding a label to a fingertip position on an original image reflecting a hand, for example. The other examples also include enclosing each item (specifically, white rice, fried vegetables, and the like, for example) on an original image reflecting a dish in a rectangle. The other examples further include painting over an object region on an original image reflecting an object such as a photograph of a room.

Figure 3:
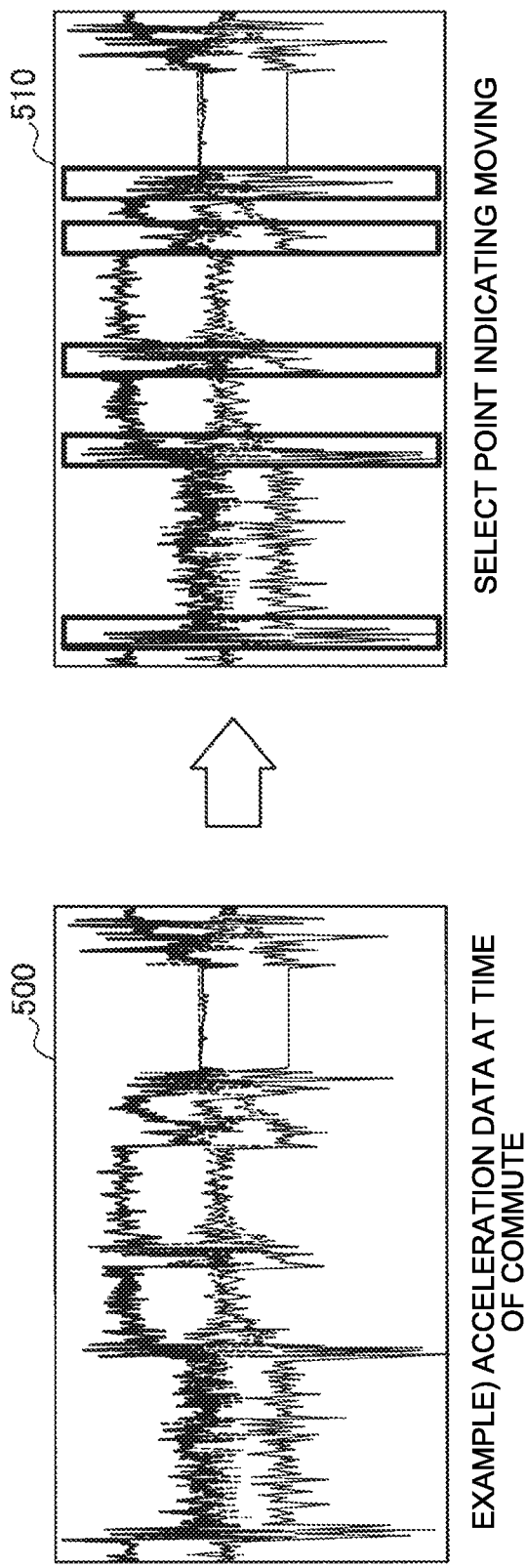
FIG. 3 is a diagram for explaining an example of labeling on sensor data.

A target of labeling is not limited to image data, and may be a voice signal (for example, a voice collected by a microphone) or a biomedical signal (for example, heartbeat, pulses, blood pressure, a sweat rate, an electromyography value, brain waves, and the like), for example. For example, in a waveform of a voice signal, an utterance point may be selected. In a waveform of heartbeat, a point indicating a predetermined reaction may be selected. Alternatively, the target of labeling may be, for example, sensing data of an acceleration sensor, a gyro sensor, a geomagnetic sensor, and the like. For example, as illustrated in FIG. 3, a point that is determined to indicate moving (refer to data 510 illustrated on the right side of FIG. 3) may be selected on triaxial acceleration data 500 at the time of commute.

Workflow of Labeling

For labeling (generation of a data set) described above, conventionally, some workflows can be assumed such as a form of being performed by a professional side on consignment, and a form of utilizing a temporary employee. FIG. 4 illustrates an example of the workflow of labeling. Examples of the form of workflow include a case of business consignment illustrated on an upper row of FIG. 4, a case of crowdsourcing illustrated on a middle row thereof, and a case of a temporary employee illustrated on a lower row thereof. Detailed process will not be described, but in a case of business consignment, for example, a trustor 20 prepares data (an image and the like) required as an advance preparation, prepares/creates a labeling tool, develops a labeling standard, and selects a labeling trustee, and then requests a trustee 21 to perform labeling. The trustee 21 selects a person in charge of labeling, and in a case of being requested to collect data, prepares required data (an image and the like), and checks man-hours and a delivery date. Until delivery from the trustee 21, the trustor 20 may give an instruction of a labeling procedure, a check for label content for training, a request for correction, progress confirmation, and the like to the trustee 21 as appropriate. The person in charge of labeling belongs to the trustee 21, so that the trustor 20 can directly give an instruction of labeling procedure and the like to the person in charge of labeling.

On the other hand, in the case of crowdsourcing, the trustor 20 makes a request to a person in charge of labeling 23 via a crowdsourcing company 22, so that the trustor 20 does not directly make contact with the person in charge of labeling 23, basically. Thus, it is difficult to make a request for labeling with detailed standards or labeling performed by using a company's own tool.

In the case of a temporary employee, an instruction for labeling content, a labeling procedure, and labeling standards can be directly given to the trustor 20 and a person in charge of labeling 24 (temporary employee) sent from each employee-leasing company, but a burden on the trustor 20 such as management of man-hours and delivery dates is increased.

Background

In any of the workflows, accuracy of the data may be changed depending on skill of the person in charge of labeling, and the instruction cannot be directly given to the person in charge of labeling in some cases depending on a request form, so that it is preferable that the trustor (or the trustee at the time of selecting the person in charge of labeling) can grasp evaluation of the person in charge of labeling to improve quality of the data set used for machine learning.

On a side of the person in charge of labeling, it is preferable to perform labeling efficiently because it takes much time for labeling of massive amount of data.

Thus, the present embodiment enables support for efficient generation of the data set (automatic generation of a prelabel), and evaluation of the person in charge of labeling based on a process of generating the data set to achieve quality improvement of the data set used for machine learning.

2. CONFIGURATION EXAMPLE

Figure 5:
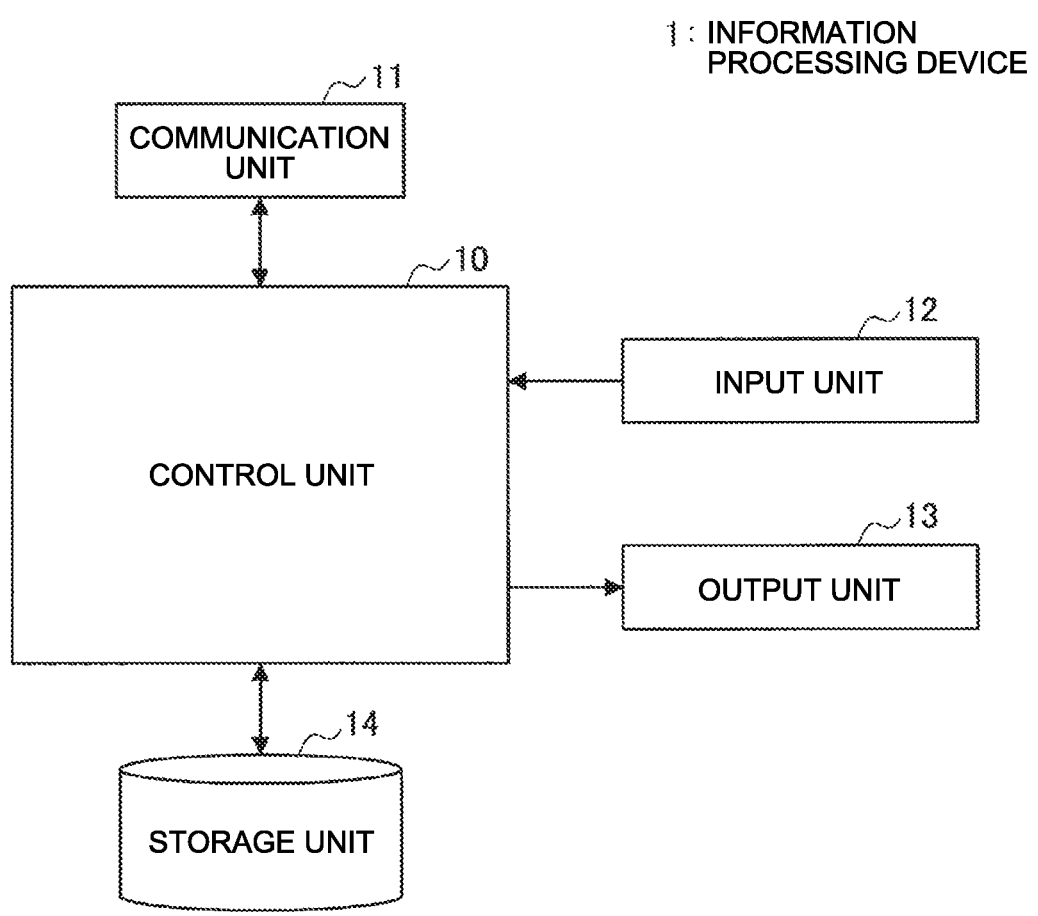
FIG. 5 is a block diagram illustrating an example of a configuration of an information processing device according to the present embodiment.

FIG. 5 is a block diagram illustrating an example of a configuration of the information processing device 1 according to the present embodiment. As illustrated in FIG. 5, the information processing device 1 includes a control unit 10, a communication unit 11, an input unit 12, an output unit 13, and a storage unit 14.

The control unit 10 functions as an arithmetic processing device and a control device, and controls the entire operation in the information processing device 1 in accordance with various computer programs. The control unit 10 is implemented by an electric circuit such as a central processing unit (CPU) and a microprocessor, for example. The control unit 10 may include a read only memory (ROM) that stores a computer program, an arithmetic parameter, and the like to be used, and a random access memory (RAM) that temporarily stores a parameter and the like that vary as appropriate.

The communication unit 11 is communicatively connected to an external device in a wired or wireless manner, and transmits/receives data to/from the external device. For example, the communication unit 11 is connected to a network via a wired/wireless Local Area Network (LAN), Wi-Fi (registered trademark), Bluetooth (registered trademark), a portable communication network (Long Term Evolution (LTE), a third-generation mobile object communication scheme (3G)), or the like, and may transmit/receive the data to/from the external device via the network.

The input unit 12 detects an operation input to the information processing device 1 from a user, and outputs the operation input to the control unit 10. The input unit 12 may be, for example, a touch sensor, a pressure sensor, or a proximity sensor. Alternatively, the input unit 12 may have a physical configuration such as a button, a switch, a lever, and the like.

The output unit 13 has a function of outputting information from the information processing device 1 to the user (in this case, the person in charge of labeling). For example, the output unit 13 is a display device that outputs various operation screens, menu screens, and the like such as a display screen of original data (labeling target data) collected on the network and the like, and a labeling screen. For example, the output unit 13 is implemented by a display device such as a liquid crystal display (LCD) and an organic electro luminescence (EL) display.

The storage unit 14 is implemented by a read only memory (ROM) that stores a computer program, an arithmetic parameter, and the like to be used for processing performed by the control unit 10, and a random access memory (RAM) that temporarily stores a parameter and the like that vary as appropriate.

Functional Configuration of Information Processing Device 1

Figure 6:
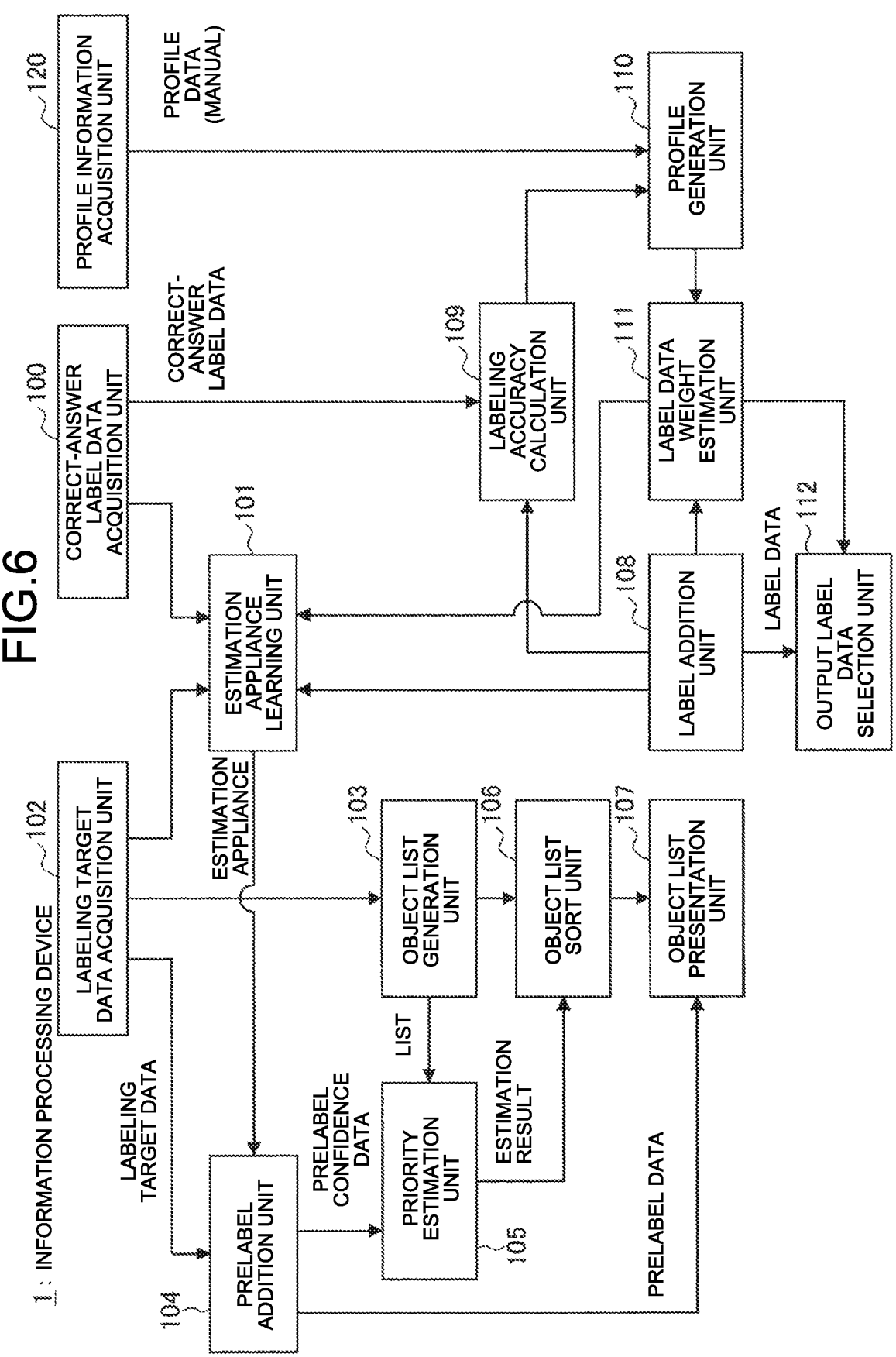
FIG. 6 is a diagram illustrating an example of a functional configuration implemented by a control unit of the information processing device according to the present embodiment.

Subsequently, the following describes a functional configuration implemented by the control unit 10 of the information processing device 1 according to the present embodiment with reference to FIG. 6. FIG. 6 is a diagram illustrating an example of the functional configuration implemented by the control unit 10 of the information processing device 1 according to the present embodiment.

As illustrated in FIG. 6, the information processing device 1 functions as a correct-answer label data acquisition unit 100, an estimation appliance learning unit 101, a labeling target data acquisition unit 102, an object list generation unit 103, a prelabel addition unit 104, a priority estimation unit 105, an object list sort unit 106, an object list presentation unit 107, a label addition unit 108, a labeling accuracy calculation unit 109, a profile generation unit 110, a label data weight estimation unit 111, and an output label data selection unit 112.

The information processing device 1 may generate a profile of each person in charge of labeling by the profile generation unit 110 to be accumulated in the storage unit 14 based on profile data of the person in charge of labeling acquired by the profile information acquisition unit 120. The acquired profile data may be accumulated in the storage unit 14 as occasion demands. The profile data of the person in charge of labeling may be manually input by an administrator (a person who evaluates a result achieved by each person in charge of labeling) via a profile input screen, for example. Specifically, for example, years of experience, a track record of prizes, special notes, and the like are manually input. An ID is given to the person in charge of labeling, and the profile data of each person in charge of labeling may be managed with the ID. The profile generation unit 110 can also generate the profile based on a process of generating the label data by the person in charge of labeling. For example, labeling accuracy calculated by the labeling accuracy calculation unit 109 may be added to the profile data. The profile generation unit 110 may also calculate, as the profile data of the person in charge of labeling, labeling speed (speed of labeling) of the person in charge of labeling, labeling cost (unit cost), a suitability rank (based on labeling accuracy, labeling speed, and the like of the person in charge of labeling, for example), aging stability (based on an annual variation of a mean value of a label error, for example), and the like (that is, evaluate the person in charge of labeling). Details will be described later with reference to FIG. 24 to FIG. 30. The generated profile data is accumulated in the storage unit 14, and is appropriately referred to, as an indicator indicating who will receive a request, by a labeling requestor at the time of making a request for labeling.

The labeling accuracy calculation unit 109 compares correct-answer label data acquired from the correct-answer label data acquisition unit 100 with the label data generated by the person in charge of labeling output from the label addition unit 108 to calculate the labeling accuracy. Details will be described later with reference to FIG. 17 to FIG. 23.

The label data weight estimation unit 111 applies a weight to a label having high accuracy, and outputs label weight data to the output label data selection unit 112 and the estimation appliance learning unit 101. For example, based on the profile data such as the labeling accuracy of the person in charge of labeling acquired from the profile generation unit 110, the label data weight estimation unit 111 may increase the weight to be applied to the label data created by the person in charge of labeling who is highly evaluated. The label data weight estimation unit 111 may regard the label data that is corrected by the person in charge of labeling and acquired from the label addition unit 108 (for example, data obtained by correcting, by the person in charge of labeling, prelabel data (temporal label data) that is automatically added by machine learning) as label data having high accuracy, and may increase the weight to be applied thereto.

The output label data selection unit 112 can select output data as appropriate at the time of outputting, to the requestor and the like, for example, the label data that is generated by the person in charge of labeling and acquired from the label addition unit 108. For example, the output label data selection unit 112 may preferentially select data having higher accuracy based on the label weight data acquired from the label data weight estimation unit 111. Alternatively, the information processing device 1 may output all pieces of the label data without selecting any piece thereof, and without using the output label data selection unit 112. The information processing device 1 may output the label data together with the labeling target data (which is data as a target to which the label is added, and acquired by the labeling target data acquisition unit 102).

The estimation appliance learning unit 101 performs machine learning based on the labeling target data acquired from the labeling target data acquisition unit 102 and the correct-answer label data (teacher data) acquired from the correct-answer label data acquisition unit 100. An algorithm for machine learning is not limited, and an existing algorithm may be used as appropriate. The labeling target data acquisition unit 102 and the correct-answer label data acquisition unit 100 acquire, from the input unit 12 and the communication unit 11, for example, a data set for learning of label addition (addition of a prelabel) that is input by the person in charge of labeling, the requestor, and the like. The estimation appliance learning unit 101 can also perform learning with likelihood using the label weight data output from the label data weight estimation unit 111 to increase accuracy in machine learning.

The prelabel addition unit 104 performs labeling on the labeling target data output from the labeling target data acquisition unit 102 using an estimation appliance generated by the estimation appliance learning unit 101. Herein, labeling by machine learning is referred to as "prelabel (temporary label) addition", and the generated data is referred to as "prelabel data".

The object list generation unit 103 generates an object list based on the labeling target data (object) output from the labeling target data acquisition unit 102. For generating the object list, a predetermined estimation appliance generated by machine learning may be used. For example, in a case of collecting pieces of image data of "family photograph", a large number of pieces of correct-answer image data of the "family photograph" may be learned in advance, and the image data of "family photograph" may be extracted from the labeling target data.

The object list sort unit 106 sorts the object list generated by the object list generation unit 103 based on predetermined standards, and outputs the object list to the object list presentation unit 107. For example, the object list sort unit 106 sorts the object as appropriate based on an estimation result obtained by the priority estimation unit 105.

Figure 7:
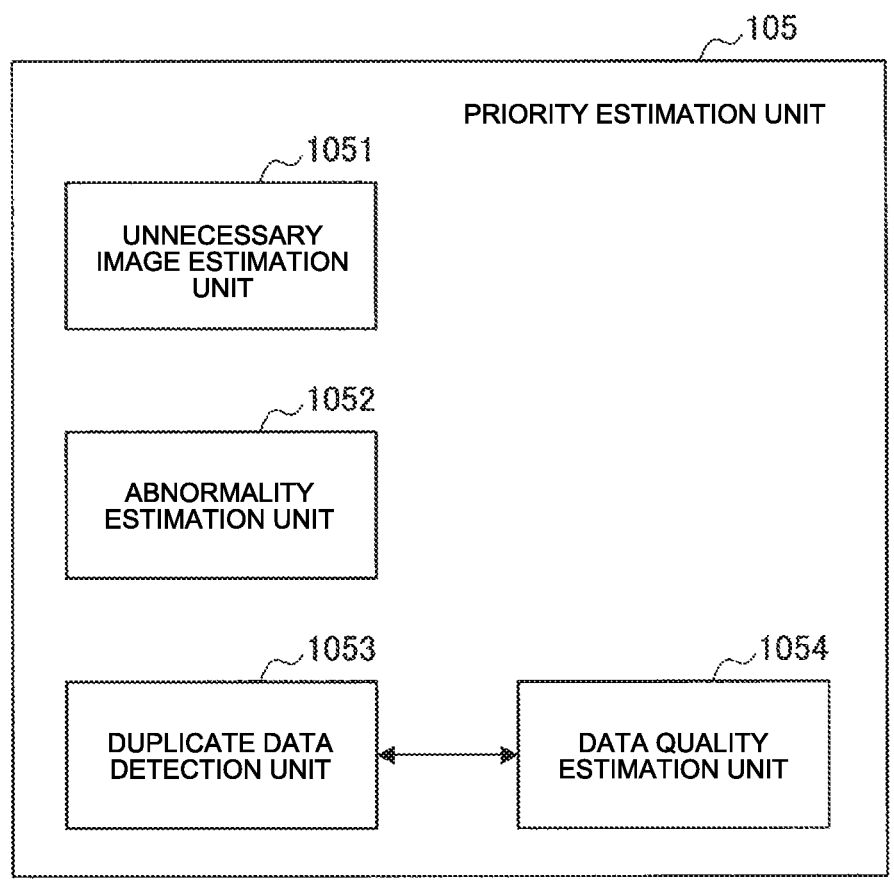
FIG. 7 is a diagram illustrating an example of a specific functional configuration of a priority estimation unit according to the present embodiment.

The priority estimation unit 105 estimates priority of each object (labeling target data), and outputs an estimation result to the object list sort unit 106. Specifically, as illustrated in FIG. 7, the priority estimation unit 105 functions as an unnecessary image estimation unit 1051, an abnormality estimation unit 1052, a duplicate data detection unit 1053, and a data quality estimation unit 1054. Details will be described later with reference to FIG. 9 to FIG. 14. For example, the unnecessary image estimation unit 1051 estimates unnecessary data from the labeling target data using an unnecessary image estimation appliance that has learned a small number of unnecessary images (input by the person in charge of labeling and the like). As an example, the present embodiment describes a case in which the labeling target data (object) is image data, and the unnecessary image is estimated from the labeling target data. Due to this, the control unit 10 repeatedly performs processing of excluding the unnecessary image from the labeling target data after presenting the object list that preferentially displays the unnecessary image to the person in charge of labeling (or a data collector such as a trustor) to be checked, and enables desired data to be left efficiently.

The abnormality estimation unit 1052 performs abnormality detection on the labeling target data (for example, image data), and estimates data having a high abnormal value, that is, rare data (which is one of various types of novel images, and is difficult to be determined by an NG image estimation appliance, for example). In the abnormality detection, for example, high priority is set to an image that is not similar to accumulated image data being associated with a collection keyword (for example, "family photograph"). Alternatively, in the abnormality detection, high priority is set to an image taking a value close to a boundary value in the estimation appliance for generating the object list used by the object list generation unit 103, or an image estimated to have low likelihood in a case of using an estimation appliance with likelihood. Due to this, the control unit 10 repeatedly performs processing of excluding the unnecessary image from the labeling target data after presenting the object list that preferentially displays an abnormal image to the person in charge of labeling to be checked, and enables desired data to be left efficiently. Alternatively, the object list sort unit 106 may create an object list that preferentially displays the unnecessary image and the abnormal image to be checked by the person in charge of labeling based on an estimation result obtained by the abnormality estimation unit 1052 and an estimation result obtained by the unnecessary image estimation unit 1051.

The duplicate data detection unit 1053 compares pieces of data in the labeling target data with each other to detect duplicate data. The duplicate data detection unit 1053 sets low priority to pieces of the detected duplicate data except one of them that is estimated to have the highest quality (for example, high image quality, a large image size, and the like) by the data quality estimation unit 1054. Due to this, the priority of the data having low quality is lowered among pieces of the duplicate data, and relatively, the data having high quality in the duplicate data is preferentially presented in the object list (as compared with the data having low quality), so that overlearning of the duplicate data (label addition to a duplicate image by the person in charge of labeling) is avoided, and the labeling speed is increased. The duplicate data may be detected by match retrieval, or images having slightly different sizes or an image the end of which is chipped may be detected as the duplicate data. In a case in which data being in duplicate with data to which the label has been added and having high quality is added, the duplicate data detection unit 1053 may copy the label to the data having higher quality to be added to the object list (or the label data to which the label has been added). The duplicate data detection unit 1053 may move the data having low quality to a predetermined duplicate folder (a folder that stores the duplicate data) to be excluded from the object list. At the time of exclusion, an image as an exclusion target may be presented to the person in charge of labeling to obtain approval for exclusion.

The priority estimation unit 105 may set priority to each object included in the object list based on prelabel confidence data output from the prelabel addition unit 104. The confidence data of the prelabel is reliability of labeling (prelabel) performed by machine learning, and is a value indicating an estimation width for an error in prelabel addition that is calculated in accordance with a noise level of the labeling target data (for example, image quality and a size, and in a case of sound data, magnitude of noise, smallness of sound, and the like), for example. By generating the object list that preferentially displays data having low confidence (that is, data on which prelabeling is performed, the prelabel including an error with high possibility) to be presented to the person in charge of labeling, the person in charge of labeling can review the data having low confidence intensively, add the label thereto, and improve accuracy of the label data efficiently.

The respective methods of setting the priority performed by the priority estimation unit 105 described above can be switched or combined with each other as appropriate.

The object list presentation unit 107 presents the object list sorted by the object list sort unit 106 to the person in charge of labeling via the output unit 13. The object list presentation unit 107 may also present the prelabel data created by the prelabel addition unit 104 at the same time.

The label addition unit 108 accepts the label input by the person in charge of labeling via the input unit 12 for the object list presented by the object list presentation unit 107. The label addition unit 108 also accepts label correction input by the person in charge of labeling via the input unit 12 for the prelabel. The label data (including collection data of the prelabel) is output to the output label data selection unit 112, and transmitted to the requestor and the like. The label data may be output to the estimation appliance learning unit 101 for machine learning, output to the labeling accuracy calculation unit 109 for calculating accuracy of the person in charge of labeling, or output to the label data weight estimation unit 111 for estimating the weight of the label data. The label data may also be accumulated in the storage unit 14.

The configuration of the information processing device 1 according to the present embodiment has been specifically described above. The configuration of the information processing device 1 illustrated in FIG. 5 to FIG. 7 is merely an example, and the present embodiment is not limited thereto. For example, at least part of the configuration of the information processing device 1 may be included in an external device, or at least part of the functions of the control unit 10 may be implemented by a server and the like.

3. OPERATION PROCESSING

Figure 8:
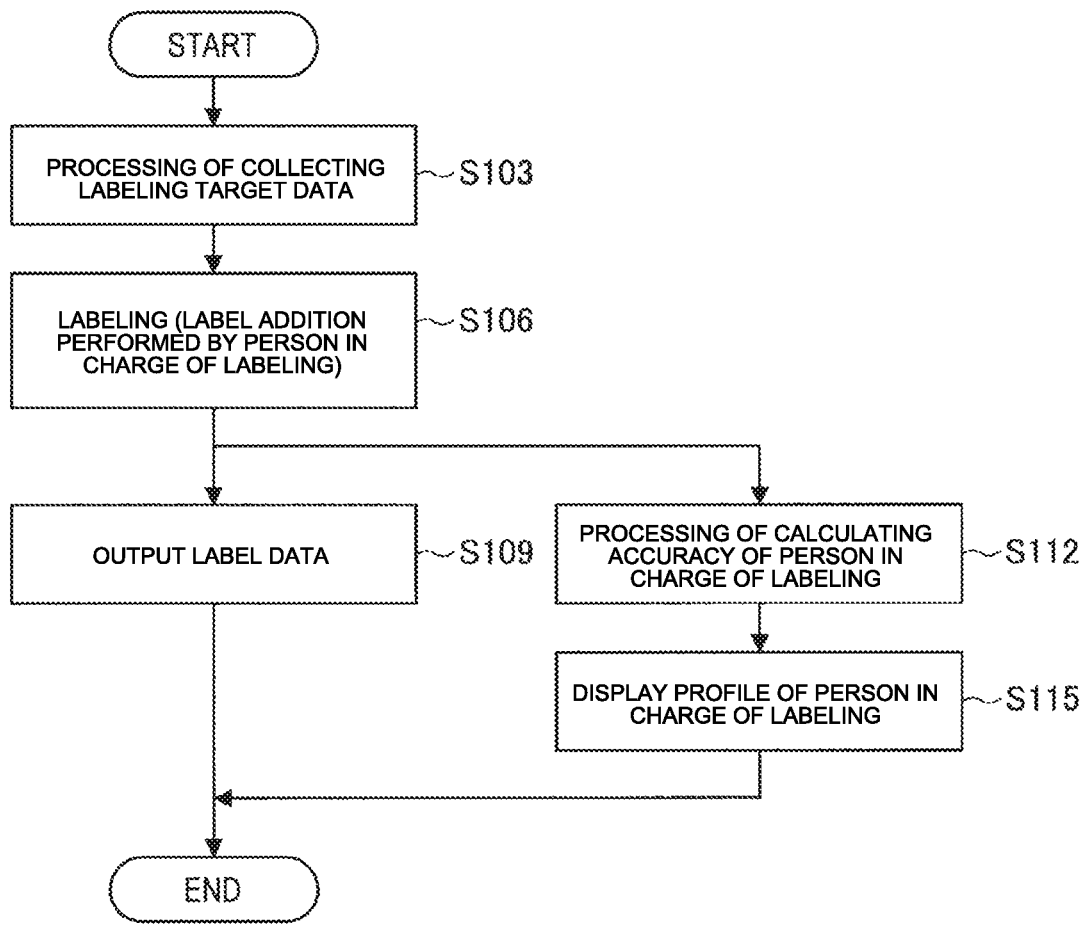
FIG. 8 is a flowchart illustrating an example of a main procedure of operation processing performed by the information processing device according to the present embodiment.

Subsequently, the following specifically describes operation processing performed by the information processing system according to the present embodiment with reference to the drawings. FIG. 8 is a flowchart illustrating an example of a main procedure of the operation processing performed by the information processing device 1 according to the present embodiment.

As illustrated in FIG. 8, first, the information processing device 1 performs processing of collecting the labeling target data by the labeling target data acquisition unit 102 (Step S103). The labeling target data may be collected by retrieval on a network based on a retrieval keyword, or may be collected from a predetermined server, device, and the like.

Next, the information processing device 1 performs labeling (label addition by the person in charge of labeling) on the collected labeling target data by the label addition unit 108 (Step S106). The labeling includes correction of the prelabel, for example. The collected labeling target data may be appropriately sorted by the object list sort unit 106, and presented to the person in charge of labeling by the object list presentation unit 107.

Subsequently, the information processing device 1 outputs the label data by the output label data selection unit 112 (Step S109).

The information processing device 1 can calculate accuracy of the person in charge of labeling by the labeling accuracy calculation unit 109 based on a labeling result of the person in charge of labeling (Step S112), and display a profile of the person in charge of labeling such as labeling accuracy information (Step S115).

An example of the operation processing according to the present embodiment has been described above. The operation processing illustrated in FIG. 8 is merely an example, and the present disclosure is not limited to the example illustrated in FIG. 8. For example, the present disclosure is not limited to the order of steps illustrated in FIG. 7. At least some of the steps may be processed in parallel, or may be processed in reverse order. For example, pieces of the processing at Steps S109, S112, and S115 may be processed in parallel, or may be processed in reverse order.

All pieces of the processing illustrated in FIG. 8 are not necessarily performed. Additionally, all pieces of the processing illustrated in FIG. 8 are not necessarily performed by a single device. Pieces of the processing illustrated in FIG. 8 are not necessarily performed in temporal sequence. For example, while pieces of the processing at Steps S103, S106, and S112 may be continuously performed, pieces of the processing at Steps S109 and S115 may be performed at a predetermined timing in a case in which a request is made by the requestor, for example.

4. RESPECTIVE EXAMPLES

Subsequently, the following describes respective examples of the present embodiment in detail with reference to the drawings.

4-1. Collection of Labeling Target Data

First, the following describes a system that may more efficiently collect a large amount of data having high accuracy required for implementing machine learning with high accuracy with reference to FIG. 9 to FIG. 15. Efficient collection of a large amount of data described in the present example may be implemented by the priority estimation unit 105 and the object list sort unit 106.

That is, for example, by preferentially identifying and excluding an presented NG image mixed in at the time of collection, preferentially displaying a different type of image, or identifying a duplicate image, the present system enables an unnecessary image to be excluded, and enables only a desired image to be efficiently collected from a large amount of data with high accuracy.

First Example of Data Collection

Figure 9:
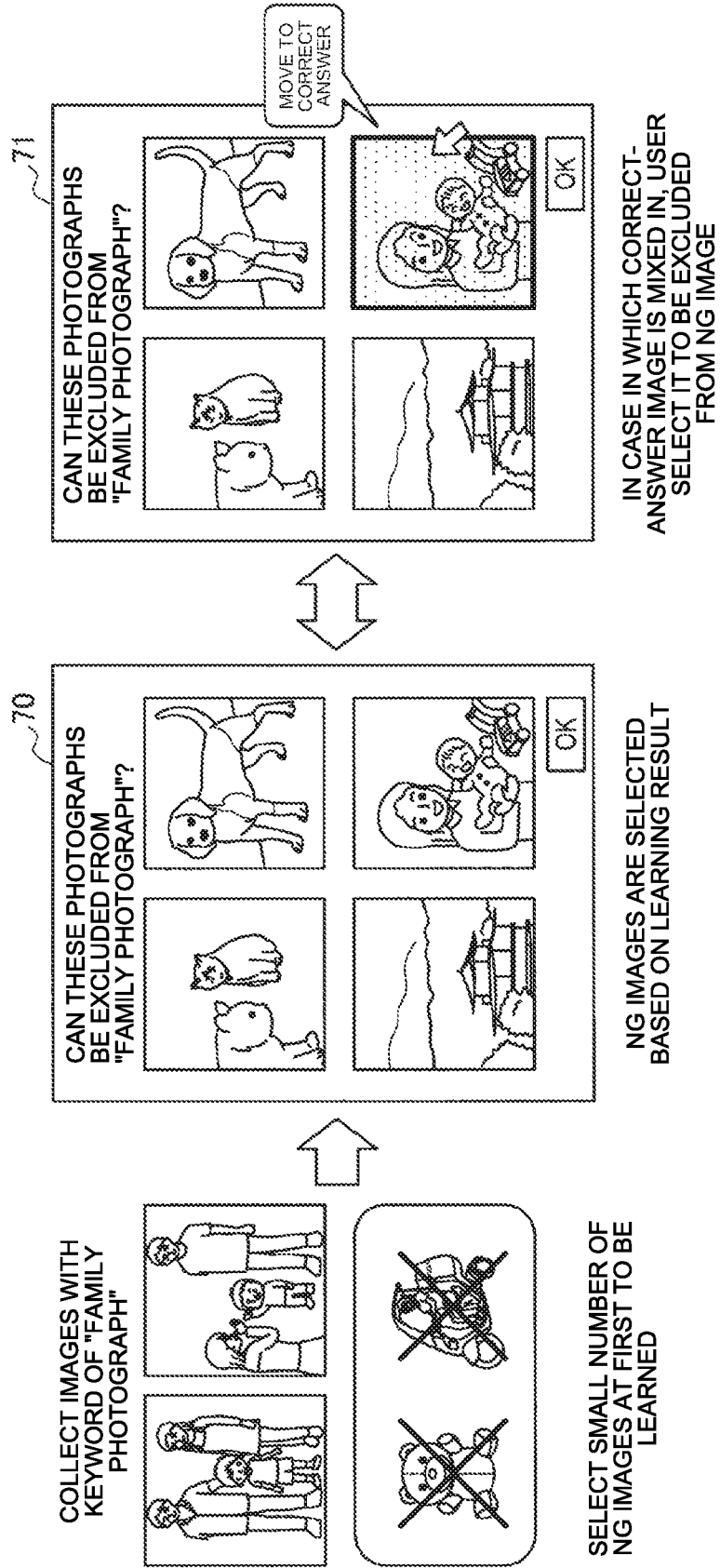
FIG. 9 is a diagram for explaining an outline of a first example of data collection according to the present embodiment.

FIG. 9 is a diagram for explaining an outline of a first example of data collection. As illustrated on the left diagram of FIG. 9, a massive amount of data is assumed to be acquired at the time when the labeling target data acquisition unit 102 of the information processing device 1 retrieves an image from the network using a keyword of "family photograph", for example, so that the person in charge of labeling (data collector) first selects a small number of NG images to be learned. Next, the unnecessary image estimation unit 1051 of the priority estimation unit 105 selects an NG image from the labeling target data as illustrated in the middle diagram of FIG. 9 based on a learning result (NG image estimation appliance), and causes a user to confirm whether to exclude the NG image. In the example illustrated in FIG. 9, four NG images are picked up, but a predetermined number of NG images, for example, 30, 50, or 100 NG images (specifically, a predetermined number of images in an upper rank that are determined to be the NG images with high possibility) are presented. Subsequently, in a case in which a correct-answer image is present in the presented NG images mixed in, as illustrated in the right diagram of FIG. 9, the person in charge of labeling selects the correct-answer image to be excluded from the NG images, and determines the NG images. By repeating such processing, accuracy of an NG image identification appliance can be improved, images other than "family photograph" (NG images) can be efficiently excluded, and desired data can be collected.

Figure 10:
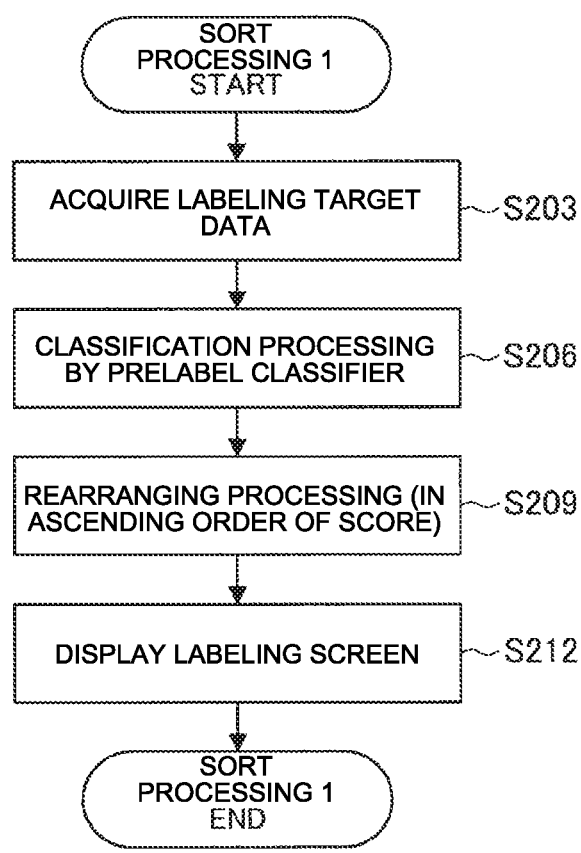
FIG. 10 is a flowchart illustrating an example of operation processing of the first example of data collection according to the present embodiment.

FIG. 10 is a flowchart illustrating an example of operation processing of the first example of data collection (sort processing 1). As illustrated in FIG. 10, first, the information processing device 1 acquires the labeling target data by the labeling target data acquisition unit 102 (Step S203). Regarding the example illustrated in FIG. 9, a plurality of pieces of data that may be the "family photograph" are collected.

Next, the unnecessary image estimation unit 1051 performs classification processing by a classifier (NG image estimation appliance) (Step S206). Regarding the example illustrated in FIG. 9, scoring is performed based on "likeness to a family photograph".

Subsequently, the object list sort unit 106 performs rearranging processing (in ascending order of the score) of the labeling target data (object) based on an estimation result obtained by the unnecessary image estimation unit 1051 (Step S209). Regarding the example illustrated in FIG. 9, the data the "likeness to a family photograph" of which is low is arranged in an upper rank.

The object list presentation unit 107 then displays the rearranged object list as a labeling screen (Step S212). Regarding the example illustrated in FIG. 9, the data the "likeness to a family photograph" of which is low is preferentially displayed, and the person in charge of labeling confirms whether to exclude the data as the NG image.

Second Example of Data Collection

Figure 11:
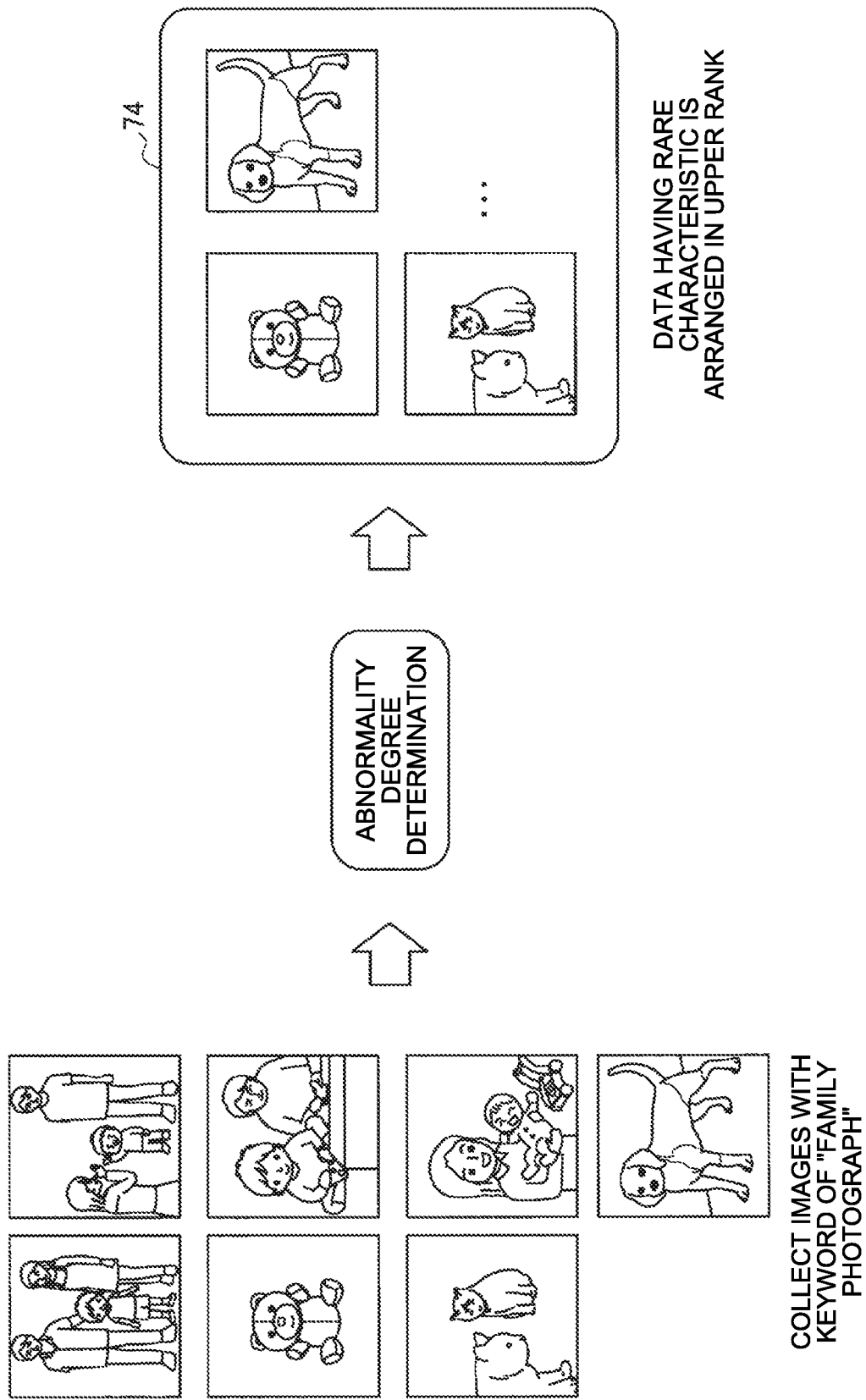
FIG. 11 is a diagram for explaining an outline of a second example of data collection according to the present embodiment.

FIG. 11 is a diagram for explaining an outline of a second example of data collection. As illustrated in the left diagram of FIG. 11, for example, at the time when the labeling target data acquisition unit 102 of the information processing device 1 retrieves extensive images using the keyword of "family photograph", abnormality degree determination is performed as illustrated in the middle diagram of FIG. 11, and an object list 74 in which data having a rare characteristic is arranged in an upper rank is presented. Due to this, the NG images can be excluded efficiently. In the abnormality degree determination, high priority can be set to various types of novel images such as an image that is difficult to be determined by the NG image estimation appliance.

Figure 12:
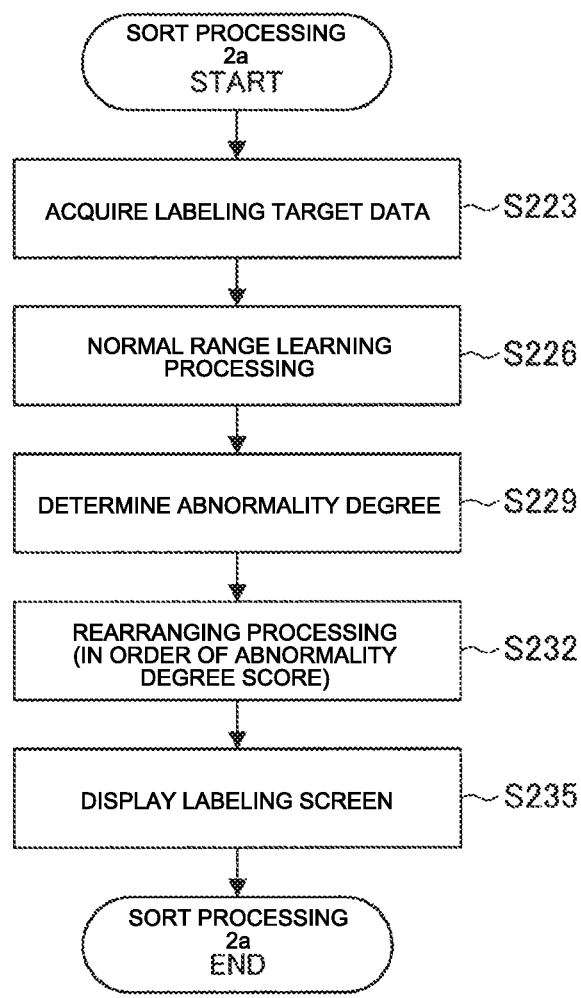
FIG. 12 is a flowchart illustrating an example of operation processing of the second example of data collection (sort processing 2a) according to the present embodiment.

FIG. 12 is a flowchart illustrating an example of operation processing of the second example of data collection (sort processing 2a). As illustrated in FIG. 12, first, the information processing device 1 acquires the labeling target data by the labeling target data acquisition unit 102 (Step S223). Regarding the example illustrated in FIG. 11, a plurality of pieces of data that may be a "family photograph" are collected.

Next, the abnormality estimation unit 1052 performs learning processing in a normal range (Step S226). Specifically, for example, the abnormality estimation unit 1052 analyzes a fluctuation state of the collected pieces of data.

Subsequently, the abnormality estimation unit 1052 determines an abnormality degree of each piece of the data (Step S229). Specifically, for example, the abnormality estimation unit 1052 gives a high score to rare data in the collected pieces of data.

Next, the object list sort unit 106 performs rearranging processing (in order of abnormality degree score) of the labeling target data (object) based on an estimation result obtained by the abnormality estimation unit 1052 (Step S232). Regarding the example illustrated in FIG. 11, data having a rare characteristic as a "family photograph" is rearranged to be in an upper rank.

The object list presentation unit 107 then displays the rearranged object list as a labeling screen (Step S235). Regarding the example illustrated in FIG. 11, data having a rare characteristic as a "family photograph" (or that is not a family photograph in fact) is preferentially displayed, and the person in charge of labeling can preferentially confirm the NG image.

The abnormality estimation unit 1052 can also perform rearranging processing by referring to the prelabel confidence data output from the prelabel addition unit 104. The following describes a modification of the present example with reference to FIG. 13.

Figure 13:
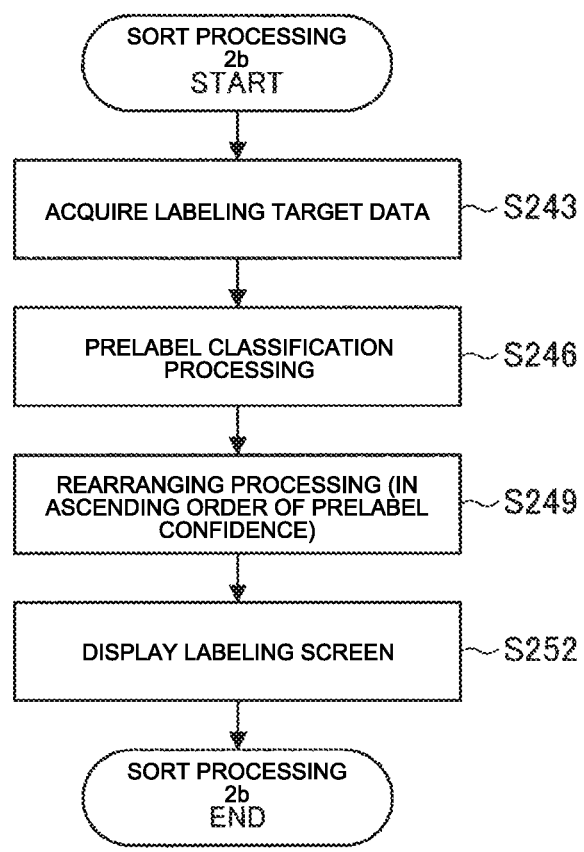
FIG. 13 is a flowchart illustrating a modification of operation processing of the second example of data collection (sort processing 2b) according to the present embodiment.

FIG. 13 is a flowchart illustrating a modification of operation processing of the second example of data collection (sort processing 2b). As illustrated in FIG. 13, first, the information processing device 1 acquires the labeling target data by the labeling target data acquisition unit 102 (Step S243). Regarding the example illustrated in FIG. 11, a plurality of pieces of data that may be a "family photograph" are collected.

Next, prelabel classification processing is performed by the prelabel addition unit 104 (Step S246). The prelabel addition unit 104 calculates prelabel confidence data for each piece of the data at the same time as the prelabel classification processing, and outputs the prelabel confidence data to the abnormality estimation unit 1052. Regarding the example illustrated in FIG. 11, the prelabel confidence data is scored as "likeness to a family photograph".

Subsequently, the object list sort unit 106 performs rearranging processing (in ascending order of prelabel confidence) of the labeling target data (object) based on the priority that is set in accordance with the prelabel confidence data by the abnormality estimation unit 1052 (Step S249). Regarding the example illustrated in FIG. 9, the pieces of data are arranged in ascending order of the score (confidence) of "likeness to a family photograph".

The object list presentation unit 107 then displays the rearranged object list as a labeling screen (Step S252). Regarding the example illustrated in FIG. 11, data the "likeness to a family photograph" of which is not clearly known to the prelabel classifier is preferentially displayed, and the person in charge of labeling can efficiently perform labeling on the data in ascending order of the score obtained by the classifier.

Third Example of Data Collection

By identifying the duplicate image, and setting low priority to an image having low quality among duplicate images, the priority estimation unit 105 enables the same images not to be displayed, enables overlearning to be avoided, and enables efficiency of data collection to be improved.

Figure 14:
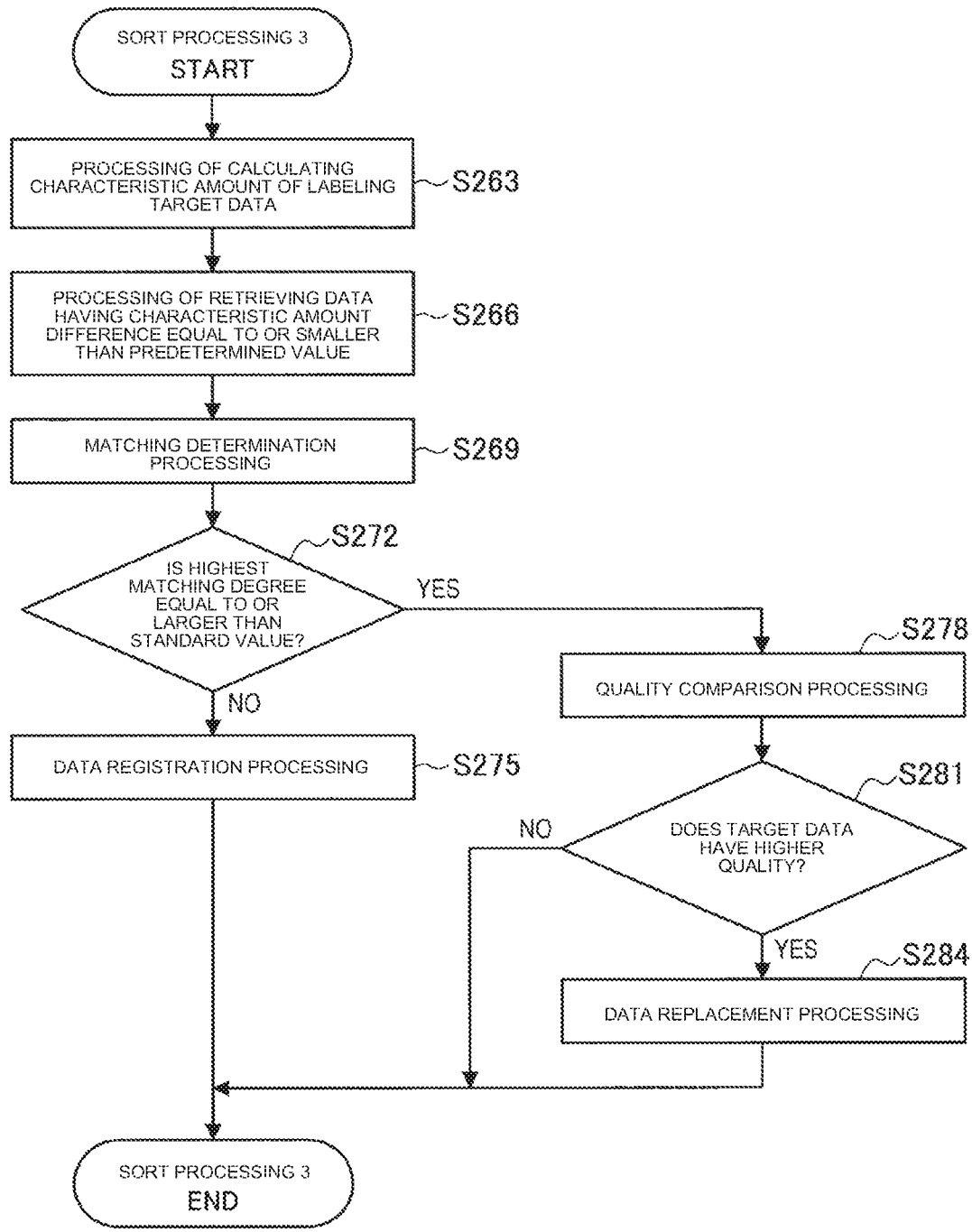
FIG. 14 is a flowchart illustrating an example of operation processing of a third example of data collection (sort processing 3) according to the present embodiment.

FIG. 14 is a flowchart illustrating an example of operation processing of a third example of data collection (sort processing 3). As illustrated in FIG. 14, first, the duplicate data detection unit 1053 calculates a characteristic amount of the labeling target data (Step S263), and retrieves pieces of data having a characteristic amount difference equal to or smaller than a predetermined value (Step S266). Due to this, a plurality of pieces of data "having characteristic amounts close to each other" are listed up.

Next, the duplicate data detection unit 1053 performs matching determination processing (Step S269). For example, the duplicate data detection unit 1053 performs matching determination processing for each of the pieces of listed-up data and the target data, and causes data having the highest matching degree indicator in the list to be matching target data.

Subsequently, the duplicate data detection unit 1053 determines whether the highest matching degree indicator is equal to or larger than a standard value (Step S272).

Next, if the highest matching degree is equal to or larger than the standard value (Yes at Step S272), quality comparison processing is performed by the data quality estimation unit 1054 (Step S278). In the quality comparison processing, data qualities are compared with each other based on resolution, a data size, a noise amount, and the like in a case of an image, for example.

Subsequently, it is determined whether the quality of the target data is higher (Step S281). In this case, a pair of image quality indicators is compared with each other to determine whether the quality of the target data is higher.

Next, if the quality of the target data is higher (Yes at Step S281), the duplicate data detection unit 1053 performs data replacement processing (Step S284). In the data replacement processing, the target data is registered to be retrievable as the labeling target data, and data as a comparison target (in this case, data having lower quality) is excluded from the labeling target data. At this point, the target data may inherit the label information added to the data as the comparison target. At the time of inheriting, correction processing may be performed such that, in a case in which resolution of pieces of image data is different, for example, linear transformation may be applied to a coordinate value label to be moved to corresponding coordinates.

On the other hand, if the highest matching degree is not equal to or larger than the standard value (No at Step S272), the duplicate data detection unit 1053 registers the target data to be retrievable as the labeling target data (Step S275).

System for Collecting and Checking Data of Abnormal Condition Later

In other data collection methods, there is data that is difficult to be collected such as data the occurrence frequency of which is low, for example. In this case, such data may be picked up from the data that has been already recorded. For example, if overlooking, delay of determination, a near miss, and the like that are hardly detected from only an image can be added as candidates for the abnormal condition due to cooperation between an image by a drive recorder at the time of driving and multimodal such as heartbeat, a sign of new abnormality is enabled to be detected.

Figure 15:
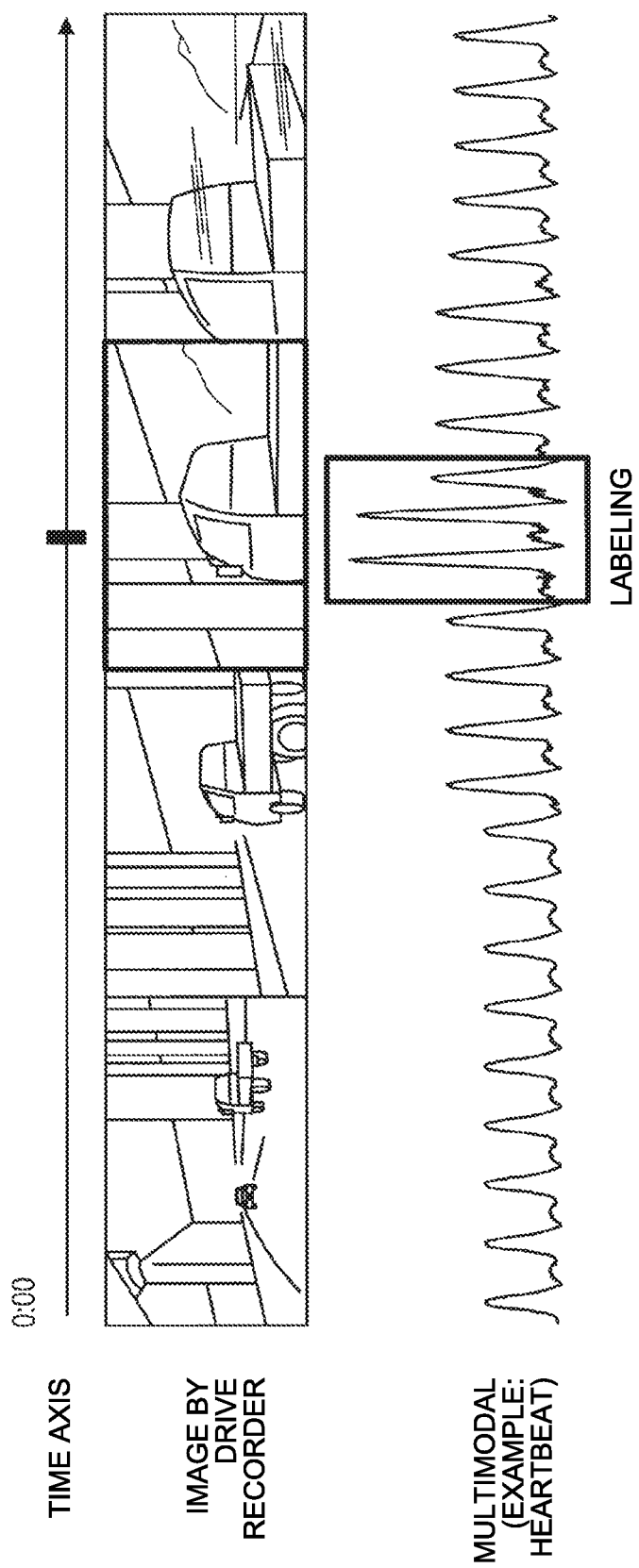
FIG. 15 is a diagram for explaining collection of abnormal condition data at the time of driving by causing a drive recorder and multimodal (for example, heartbeat) to cooperate with each other according to the present embodiment.

FIG. 15 is a diagram for explaining collection of abnormal condition data at the time of driving by causing a drive recorder and multimodal (for example, heartbeat) to cooperate with each other. As illustrated in FIG. 15, for example, in a case of performing labeling on the abnormal condition data from multimodal, data of several seconds before and after a point that is assumed to be an abnormal condition (data of an image and multimodal) is automatically saved. Due to this, it is possible to collect a near miss such as falling asleep while driving that is hardly determined to be abnormality from only an image by cooperation with heartbeat.

A system for collecting and checking the abnormal condition data later does not only collect the abnormal condition data at the time of driving with the image by the drive recorder and multimodal, but can also check a point at which a failure occurs in a factory line later, for example (as work records before and after the line is stopped, for example, a plurality of kinds of data such as a monitoring image of the work, heartbeat data of an operator, and the like are associated with each other to be automatically saved). Additionally, movement and the like of an animal with an infectious disease (an animal that becomes slow in movement, for example) in a pig farm and the like can also be checked later (a taken image, sensor data for detecting movement, and the like before and after the infectious disease appears are automatically saved). The label may be applied to time, the label may be applied to an image, or the label may be applied to sensor data such as heartbeat data. In all cases, accuracy of labeling can be improved cross-modally using multimodal.

4-2. Quality Improvement of Label Data

Conventionally, it is important to present specific standards at the time of making a request for labeling. For example, as illustrated in FIG. 16, for label work of enclosing a "face region" of a person image 800 in a rectangle, a request is made after determining standards such as "to enclose a range from a head top part to a chin vertically, and from the left ear to the right ear horizontally in a rectangle". In this case, for example, the label data including a bulging part of hair or a hair ornament deviates from the standards. The data deviating from the standards is assumed to be label data having low accuracy. Whether the label data meets the standards is visually checked by a management section of the requestor or the trustee under present circumstances, and a burden thereon is large, so that it is assumed that the management section side of the requestor or the trustee considers to select a person in charge of labeling who can create label data having high accuracy as much as possible (that is, the number of pieces of data deviating from the standards is small).

Additionally, there is a demand that a system that can create label data having high accuracy efficiently as much as possible is presented to the side of the person in charge of labeling.

Thus, the present example may provide a system that converts a difference between the label data created by the person in charge of labeling (candidate) and the correct-answer label into a numerical form to be presented to the requestor and the like as evaluation of the person in charge of labeling. The present example can also provide a system with which label data having high accuracy can be efficiently created using the prelabel to the side of the person in charge of labeling while evaluating the person in charge of labeling in a process of creating the label data using the system. The following provides specific description with reference to FIG. 17 to FIG. 23.

Labeling Accuracy Calculation Processing for Candidate for Person in Charge of Labeling (Difference from Correct-Answer Label)

Figure 17:
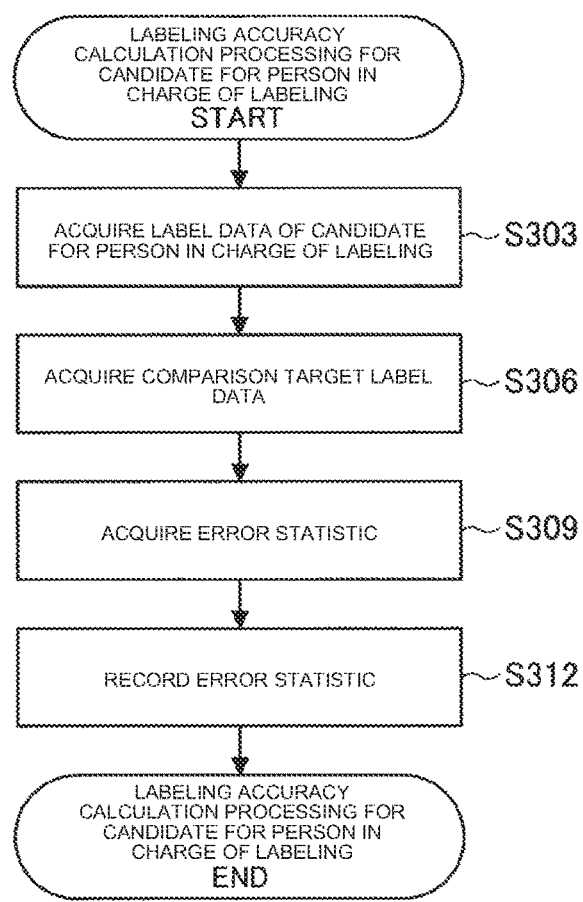
FIG. 17 is a flowchart illustrating an example of a procedure of labeling accuracy calculation processing for a candidate for a person in charge of labeling according to the present embodiment.

FIG. 17 is a flowchart illustrating an example of a procedure of labeling accuracy calculation processing for a candidate for a person in charge of labeling. As illustrated in FIG. 17, the labeling accuracy calculation unit 109 of the information processing device 1 acquires label data of a candidate for a person in charge of labeling (Step S303), and acquires comparison target label data (a correct-answer label created by a standard label creator, a mean value of labels added by a plurality of persons in charge of labeling, an output value of an estimator after learning, and the like) (Step S306).

Next, the labeling accuracy calculation unit 109 acquires (calculates) an error statistic (for example, a mean error amount, an error standard deviation, a ratio of labels falling within a predetermined upper limit error range, and the like) (Step S309), and records the error statistic (Step S312). For example, the error statistic is associated with an ID of the person in charge of labeling to be recorded in the storage unit 14.

Calculation of Mean Error of Person in Charge of Labeling after Feedback

Figure 18:
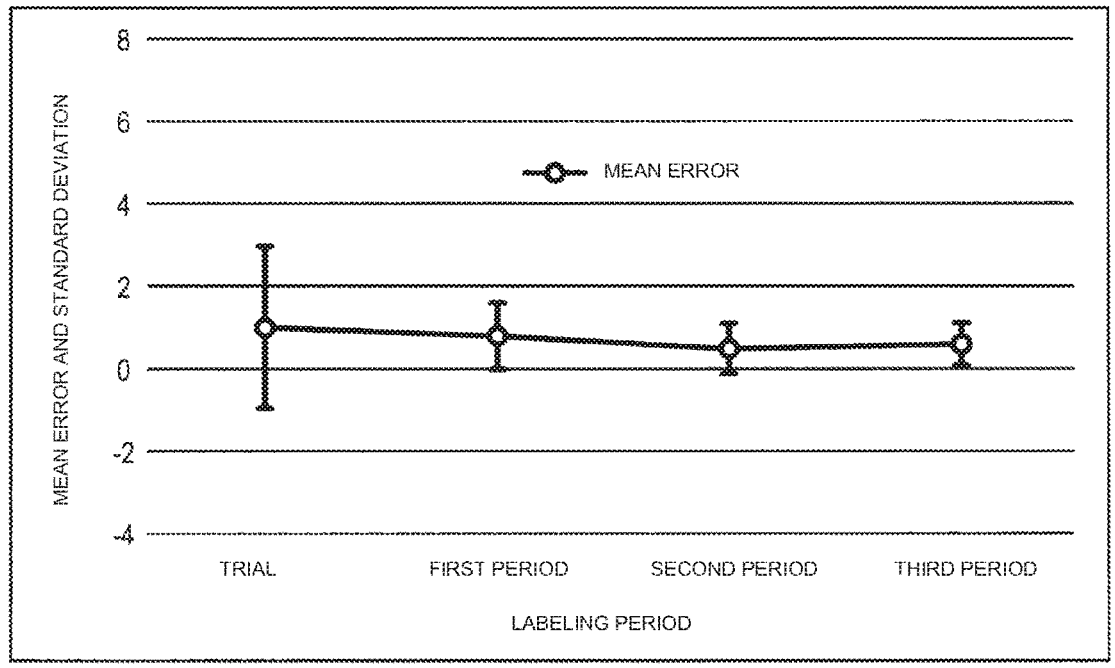
FIG. 18 is a diagram illustrating an example of calculating a mean error (good example) of a person in charge of labeling according to the present embodiment.
Figure 19:
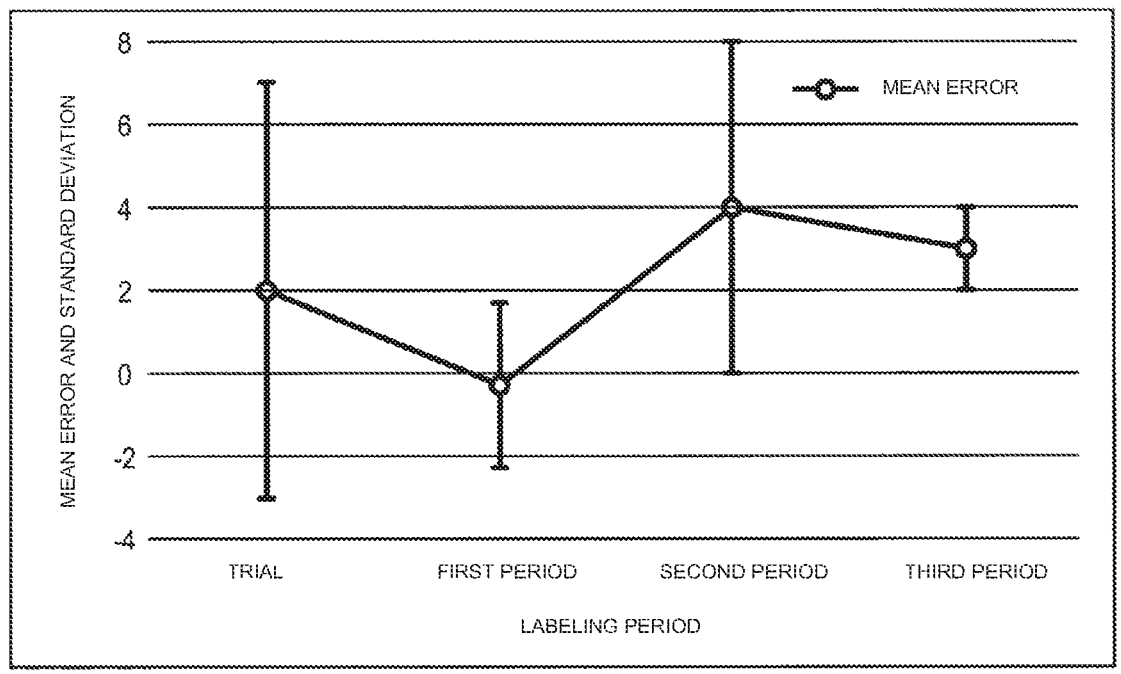
FIG. 19 is a diagram illustrating an example of calculating a mean error (unsuitable example) of the person in charge of labeling according to the present embodiment.

By calculating the mean error of the person in charge of labeling after labeling for training (which may be regarded as a trial), suitability of the person in charge of labeling is enabled to be determined. FIG. 18 and FIG. 19 illustrate an example of calculating the mean error of the person in charge of labeling. With reference to the mean error of a certain person in charge illustrated in FIG. 18, fluctuations and differences are small, and a labeling technique is stable, so that this can be said to be a good example. With reference to the mean error of another person in charge illustrated in FIG. 19, a difference from a correct answer is large, and fluctuations depending on a labeling timing are large, so that this person can be said to be unsuitable for labeling.

Figure 20:
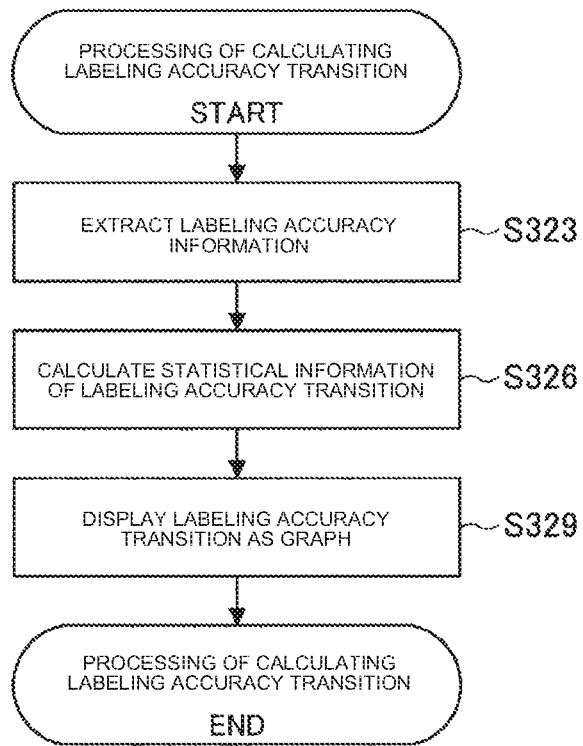
FIG. 20 is a flowchart illustrating an example of a procedure of labeling accuracy transition calculation processing according to the present embodiment.

FIG. 20 is a flowchart illustrating an example of a procedure of labeling accuracy transition calculation processing. As illustrated in FIG. 20, the profile generation unit 110 extracts labeling accuracy information from the storage unit 14 (Step S323), and calculates statistical information of labeling accuracy transition (Step S326). In the storage unit 14, a list of pairing the label data created by the target person in charge of labeling and a reference label is accumulated while being classified for each labeling work period. The profile generation unit 110 calculates the mean error and the error standard deviation for each of pair lists of respective work periods.

Subsequently, the profile generation unit 110 displays labeling accuracy transition as a graph (Step S329). For example, the profile generation unit 110 displays the mean error and the error standard deviation calculated for each work period as a graph (refer to FIG. 18 and FIG. 19).

Quality Improvement of Label Data Using Prelabel

Figure 21:
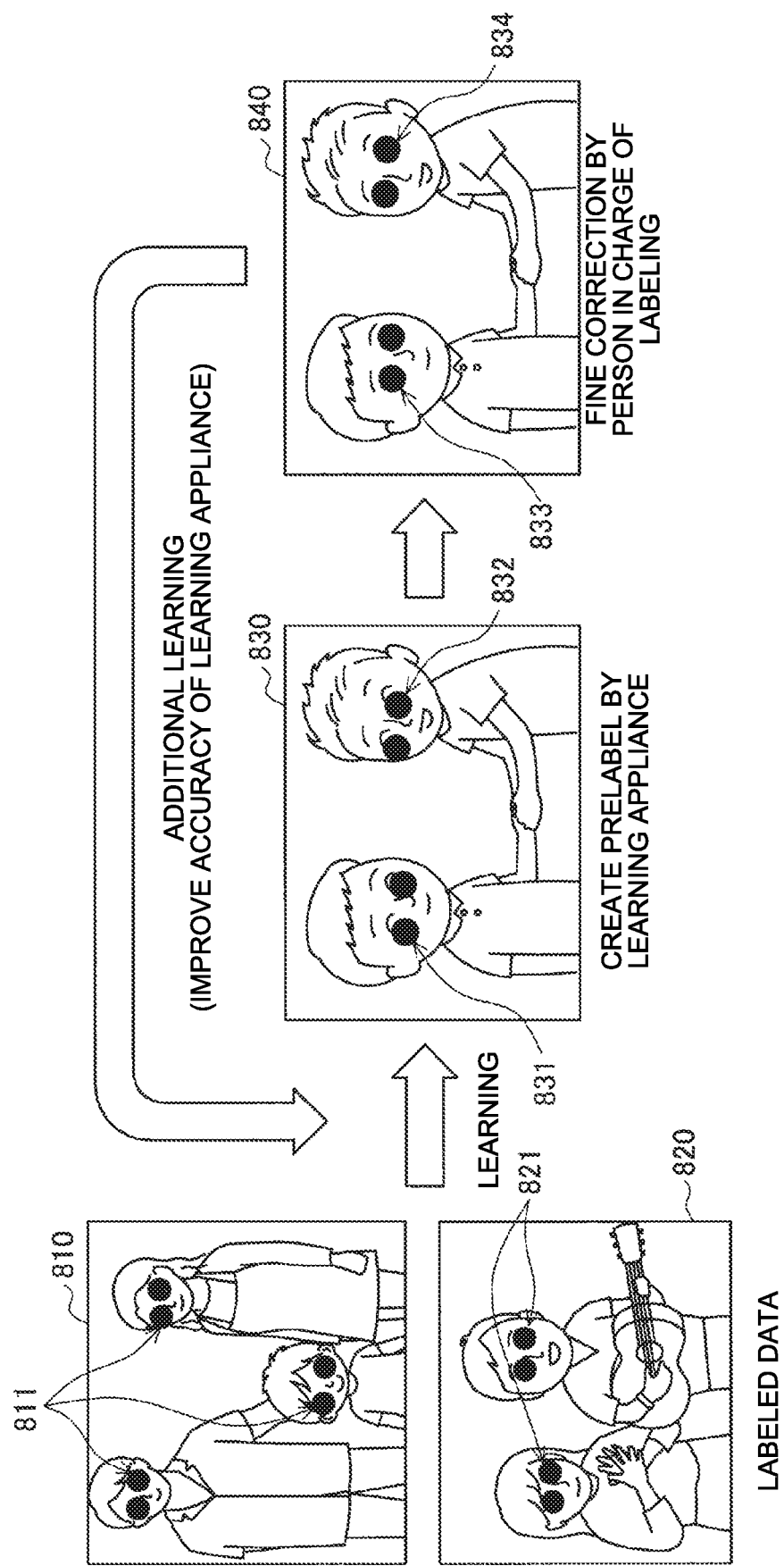
FIG. 21 is a diagram for explaining quality improvement of label data using a prelabel according to the present embodiment.

FIG. 21 is a diagram for explaining quality improvement of the label data using the prelabel. As illustrated in FIG. 21, learning is performed with a small number of pieces of label data first (a person image 810 in which labels 811 are added to eye's positions, a person image 820 in which labels 821 are added to eye's positions, and the like), and the prelabel is created by a learning appliance. Subsequently, the person in charge of labeling makes fine adjustments to the prelabel to perform additional learning. The person in charge of labeling is only required to make fine adjustments, so that labeling can be performed more efficiently. Due to additional learning with the label data to which the person in charge of labeling makes fine adjustments (label data having high accuracy), accuracy of the learning appliance can be improved.

Figure 22:
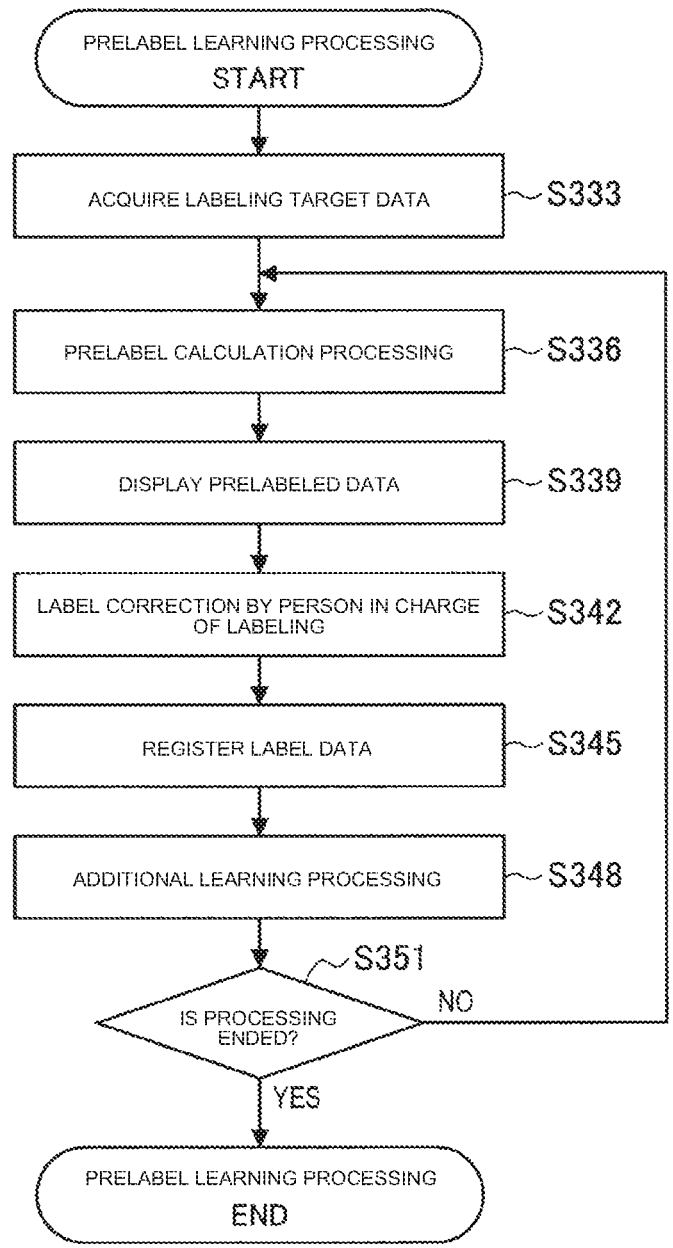
FIG. 22 is a flowchart illustrating an example of a procedure of processing of creating the label data using the prelabel according to the present embodiment.

FIG. 22 is a flowchart illustrating an example of a procedure of processing of creating the label data using the prelabel. As illustrated in FIG. 22, first, the prelabel addition unit 104 acquires the labeling target data by the labeling target data acquisition unit 102 (Step S333), and performs prelabel calculation processing (automatically generates rough label data) (Step S336).

Subsequently, the control unit 10 causes prelabeled data to be displayed to the person in charge of labeling via the output unit 13 (Step S339), and accepts label correction performed by the person in charge of labeling by the label addition unit 108 (the data is corrected to be correct label information by an operation of the person in charge of labeling) (Step S342).

Subsequently, the control unit 10 registers the label data (Step S345), and performs additional learning processing by the estimation appliance learning unit 101 (Step S348).

The pieces of processing at Steps S336 to S348 described above are repeated (Step S351).

Accordingly, accuracy of labeling can be improved. By comparing the labeling using the prelabel described above, that is, content of correction performed by the person in charge of labeling with the correct-answer data, labeling accuracy of the person in charge of labeling can be calculated at the same time. The following provides description with reference to FIG. 23.

Figure 23:
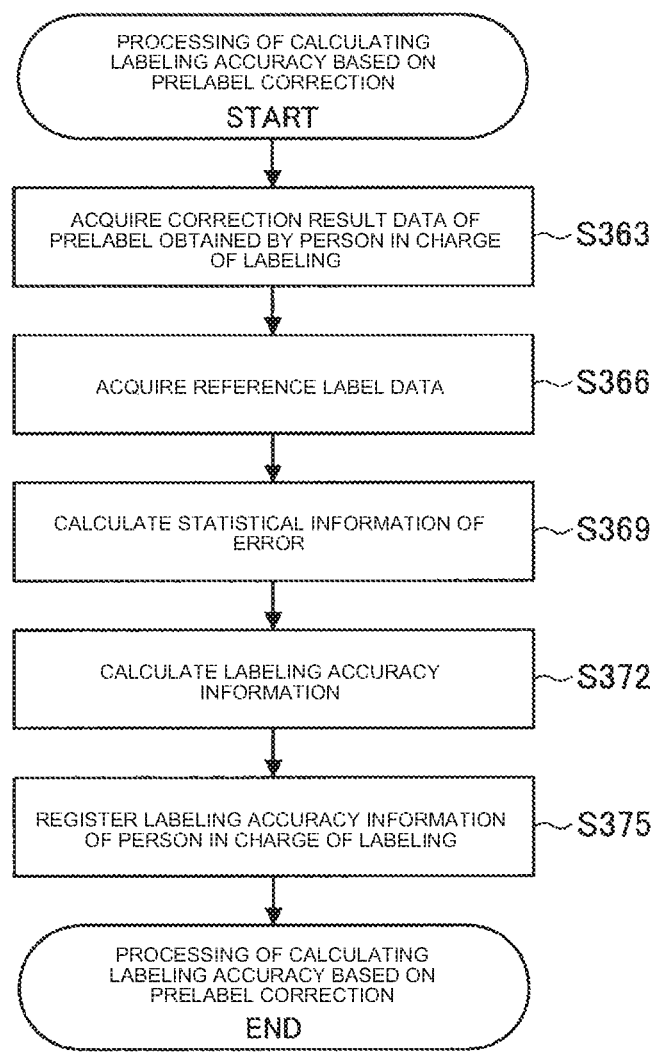
FIG. 23 is a flowchart illustrating an example of a procedure of labeling accuracy calculation processing for the person in charge of labeling based on prelabel correction according to the present embodiment.

FIG. 23 is a flowchart illustrating an example of a procedure of labeling accuracy calculation processing for the person in charge of labeling based on prelabel correction. As illustrated in FIG. 23, first, the labeling accuracy calculation unit 109 acquires correction result data of the prelabel obtained by the person in charge of labeling from the label addition unit 108 (Step S363), and acquires reference label data (a correct-answer label created by a standard label creator, a mean value of labels added by a plurality of persons in charge of labeling, an output value of an estimator after learning, and the like) from the correct-answer label data acquisition unit 100 and the like (Step S366).

Next, the labeling accuracy calculation unit 109 calculates statistical information of an error (Step S369), and calculates the labeling accuracy information (Step S372). For example, the labeling accuracy calculation unit 109 obtains an error between the reference data and the label data, and obtains a statistic of the entire list.

The labeling accuracy calculation unit 109 then registers the labeling accuracy information of the person in charge of labeling (Step S375).

Weight Estimation of Label Data

The information processing device 1 causes the label data weight estimation unit 111 to automatically apply a weight to the label data corrected by the person in charge of labeling (label having high accuracy), and causes the estimation appliance learning unit 101 to perform additional learning to enable the label having high accuracy to be learned (learning with likelihood). The person in charge of labeling may also check data not to be corrected. The prelabel may be visually checked, and an error of the label may be determined to be allowable and accepted. Additional learning may be performed with such uncorrected data, but the weight is not applied thereto in this case (alternatively, 5-multiple weight may be applied to a corrected label, and 1-multiple weight may be applied to the prelabel).

Confidence of Label Data

The information processing device 1 can also calculate, by the prelabel addition unit 104, "confidence" of the label (prelabel) created by machine learning. By presenting the object list reflecting the confidence of the label data to the person in charge of labeling, it is enabled to intensively perform label correction or a check on the data having low confidence.

4-3. Visualization of Skill of Person in Charge of Labeling

The information processing device 1 according to the present embodiment can visualize skill of the person in charge of labeling by generating a profile of the person in charge of labeling by the profile generation unit 110 to be presented to the requestor and the like.

Figure 24:
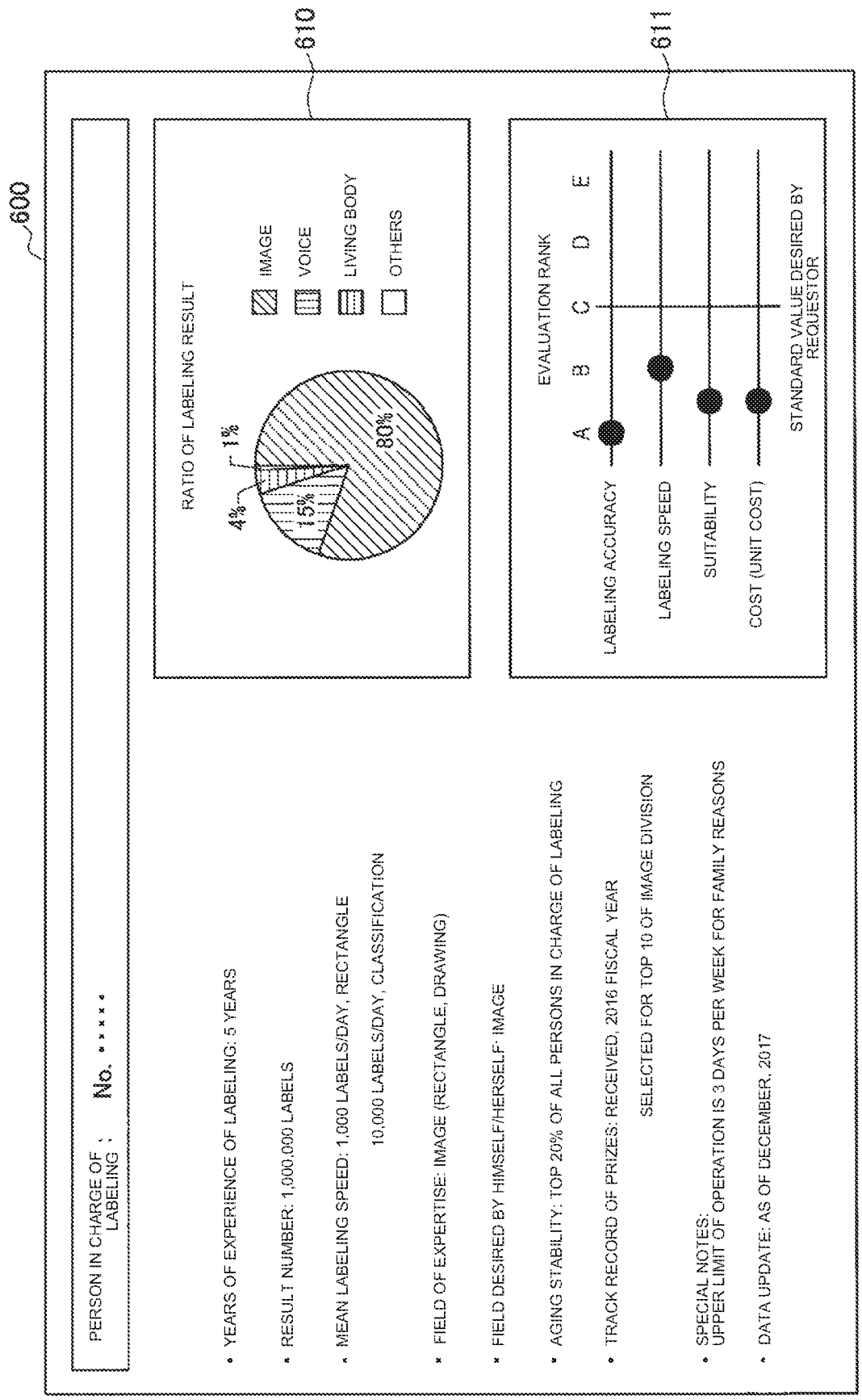
FIG. 24 is a diagram illustrating an example of a profile screen of the person in charge of labeling according to the present embodiment.

FIG. 24 is a diagram illustrating an example of a profile screen of the person in charge of labeling. As illustrated in FIG. 24, for example, a profile screen 600 displays years of experience of labeling, the result number of labels, a mean label speed, a field of expertise, a field desired by himself/herself, aging stability, a track record of prizes, special notes, a graph 610 representing a ratio of labeling result, and an evaluation rank 611. In the evaluation rank 611, for example, a rank of the person in charge of labeling based on labeling accuracy, a labeling speed, suitability, and cost (unit cost) as indicators is presented by a rank of five stages such as A to E, or a score, for example. Specific calculation processing will be described later.

A certifying examination of labeling skill and the like may be performed, and a result thereof may be caused to appear on the profile screen 600.

By visualizing the skill of the person in charge of labeling in this way, the indicator of a company or a person to whom a request is made at the time of requesting for labeling can be obtained. The skill of the person in charge of labeling can be found in advance, so that estimation of man-hours for labeling and a check can be easily made. A company that is responsible for the person in charge of labeling can make an appeal for human resource introduction.

Figure 25:
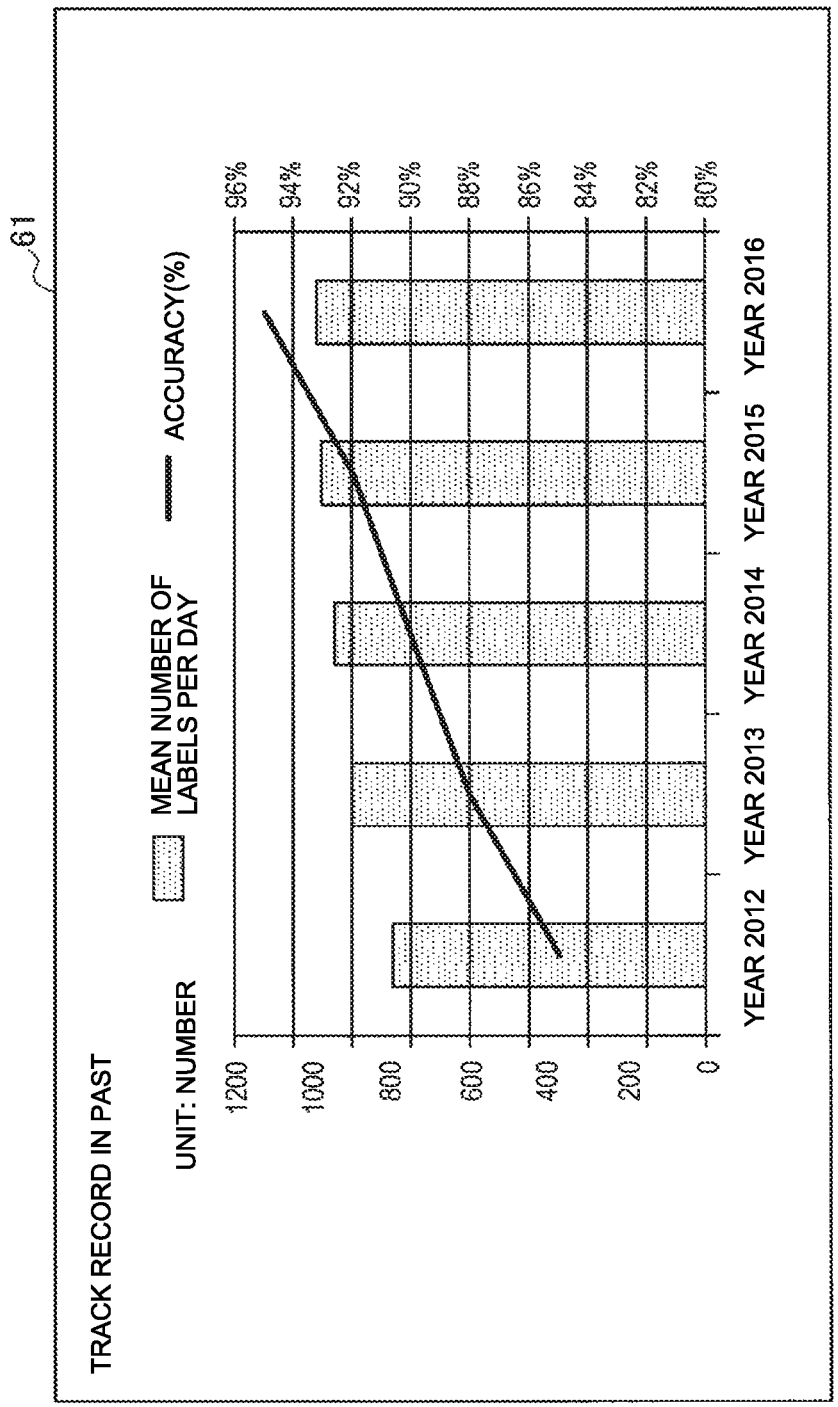
FIG. 25 is a diagram illustrating a graph representing track records of a mean number of labels per day and labeling accuracy in the past according to the present embodiment.

By updating the profile, transition from the past (inclination) and current skill can be found at a glance. For example, as illustrated in FIG. 25, a graph representing a track record of a mean number of labels per day and labeling accuracy in the past may be presented as an example of the profile. Due to this, not only a person having high skill but also a person the skill of whom will be likely increased can be grasped.

Subsequently, the following describes the calculation processing of each piece of the profile information with reference to some of the drawings.

Labeling Accuracy Calculation Processing

Figure 26:
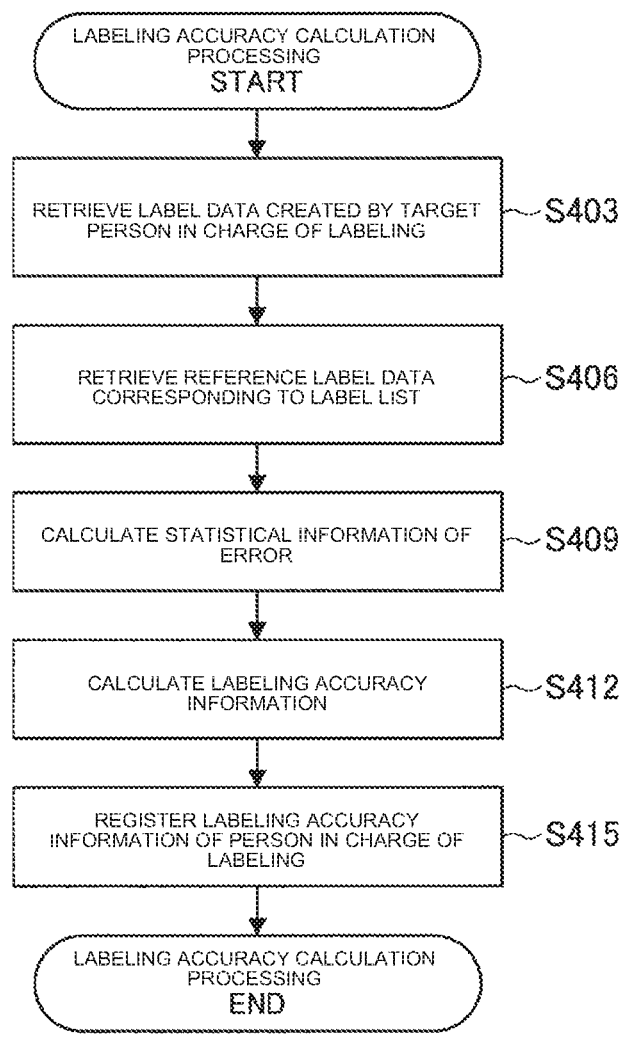
FIG. 26 is a flowchart illustrating an example of a procedure of labeling accuracy calculation processing according to the present embodiment.

FIG. 26 is a flowchart illustrating an example of a procedure of labeling accuracy calculation processing. As illustrated in FIG. 26, first, the labeling accuracy calculation unit 109 retrieves the label data created by the target person in charge of labeling from the storage unit 14 (Step S403). Past label data is accumulated in the storage unit 14. The labeling accuracy calculation unit 109 acquires a list of a predetermined type of data labeled in a predetermined period of a certain person in charge of labeling, for example.

Next, the labeling accuracy calculation unit 109 retrieves reference label data corresponding to the acquired label list (Step S406). For example, the labeling accuracy calculation unit 109 retrieves the reference data with respect to the list described above, and obtains a correspondence list (data having no correspondence is not listed).

Subsequently, the labeling accuracy calculation unit 109 calculates statistical information of an error (Step S409). For example, the labeling accuracy calculation unit 109 obtains an error between the reference data and the label data, and obtains a statistic of the entire list.

Next, the labeling accuracy calculation unit 109 calculates labeling accuracy information (Step S412). For example, the labeling accuracy calculation unit 109 compares the labeling accuracy information with a predetermined standard value to be classified into five ranks of A to E. The labeling accuracy calculation unit 109 may linearly interpolate an intermediate numerical value between standard values to be an intermediate score (B close to A, for example).

The labeling accuracy calculation unit 109 then registers the accuracy information of the person in charge of labeling in the storage unit 14 (Step S415). For example, the labeling accuracy calculation unit 109 associates the calculated statistic and rank information with the ID of the person in charge of labeling to be registered in a database (also registers a registration date).

Labeling Speed Calculation Processing

Figure 27:
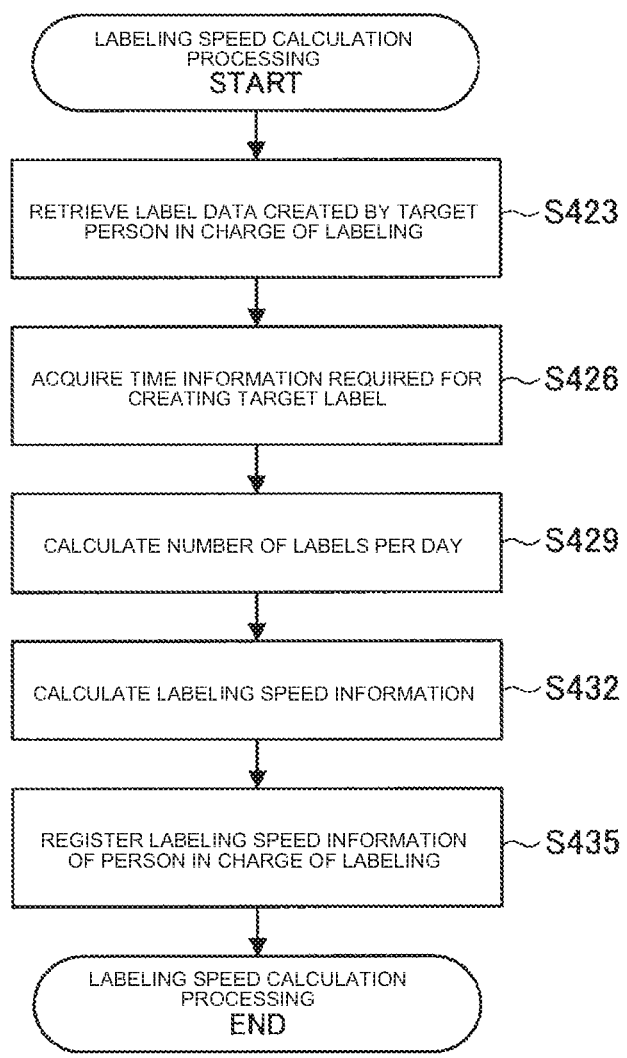
FIG. 27 is a flowchart illustrating an example of a procedure of labeling speed calculation processing according to the present embodiment.

FIG. 27 is a flowchart illustrating an example of a procedure of labeling speed calculation processing. As illustrated in FIG. 27, first, the profile generation unit 110 retrieves the label data created by the target person in charge of labeling (Step S423). For example, the profile generation unit 110 acquires, from the storage unit 14, a list of a predetermined type of data that has been labeled in a predetermined period of a certain person in charge of labeling.

Next, the profile generation unit 110 acquires time information required for labeling (Step S426). For example, the profile generation unit 110 acquires the time information required for labeling with respect to the list described above.

Subsequently, the profile generation unit 110 calculates the number of labels per day (Step S429). For example, the profile generation unit 110 adds up pieces of the acquired time information to be divided by the number of labels.

Next, the profile generation unit 110 calculates labeling speed information (Step S432). For example, the profile generation unit 110 compares the labeling speed information with a predetermined standard value to be classified into five ranks of A to E. The profile generation unit 110 may linearly interpolate an intermediate numerical value between standard values to be an intermediate score (B close to A, for example), for example.

The profile generation unit 110 then registers the labeling speed information of the person in charge of labeling (Step S435). For example, the profile generation unit 110 registers the obtained labeling speed information and rank information in the storage unit 14.

Labeling Cost Calculation Processing

Figure 28:
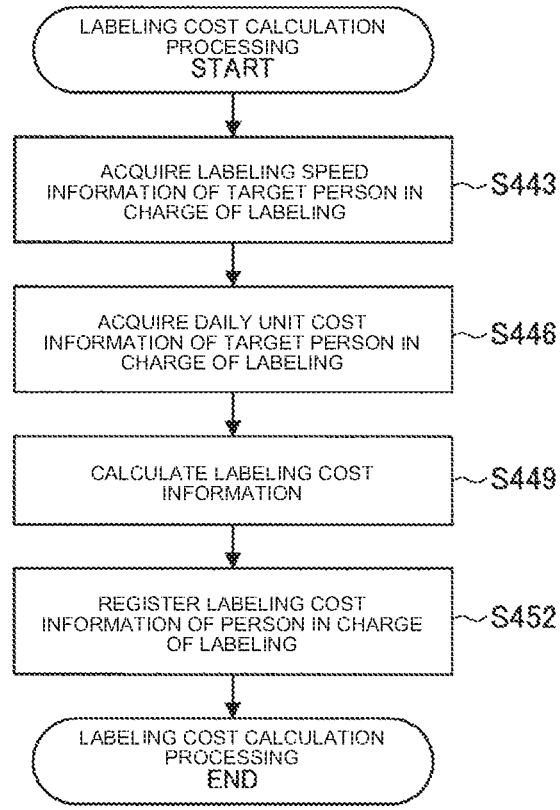
FIG. 28 is a flowchart illustrating an example of a procedure of labeling cost calculation processing according to the present embodiment.

FIG. 28 is a flowchart illustrating an example of a procedure of labeling cost calculation processing. The profile generation unit 110 acquires the labeling speed information of the target person in charge of labeling (Step S443), and acquires daily unit cost information of the target person in charge of labeling (Step S446). For example, the profile generation unit 110 acquires, from the storage unit 14, the number of pieces of labeling of a certain person in charge of labeling per day, and acquires labor unit cost information of the same person in charge of labeling per day from the storage unit 14.

The profile generation unit 110 then calculates the labeling cost information (Step S449), and registers the labeling cost information of the person in charge of labeling (Step S452). For example, the profile generation unit 110 divides the labor unit cost by the number of labels per day to calculate the unit cost per label.

Suitability Information Calculation Processing

Figure 29:
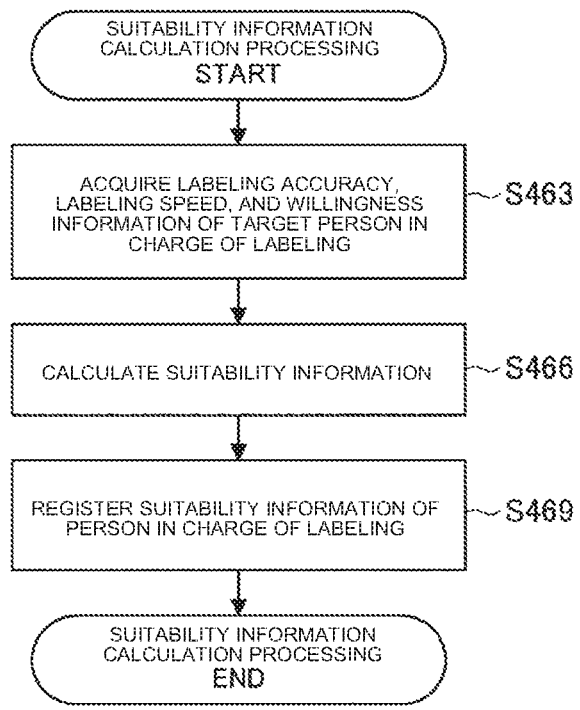
FIG. 29 is a flowchart illustrating an example of a procedure of suitability information calculation processing according to the present embodiment.

FIG. 29 is a flowchart illustrating an example of a procedure of suitability information calculation processing. As illustrated in FIG. 29, for example, the profile generation unit 110 acquires, from the storage unit 14, various pieces of rank information and the like of a certain person in charge of labeling such as the labeling accuracy information (for example, an accuracy rank), the labeling speed information (for example, a speed rank), and willingness information (for example, information about willingness for labeling input by the person in charge of labeling himself/herself, his/her boss, and the like) of the target person in charge of labeling (Step S463), and calculates the suitability information (Step S466). To calculate the suitability information, for example, weighted average rank information may be calculated by multiplying various rank values by a predetermined weight, or a weighted average rank may be revised downward to be suitability rank information using a cutoff value that is set for each rank value. Various pieces of rank information used for calculating the suitability information are not limited to the example described above.

The profile generation unit 110 then registers the suitability rank information of the person in charge of labeling (Step S469).

Aging Stability Information Calculation Processing

Figure 30:
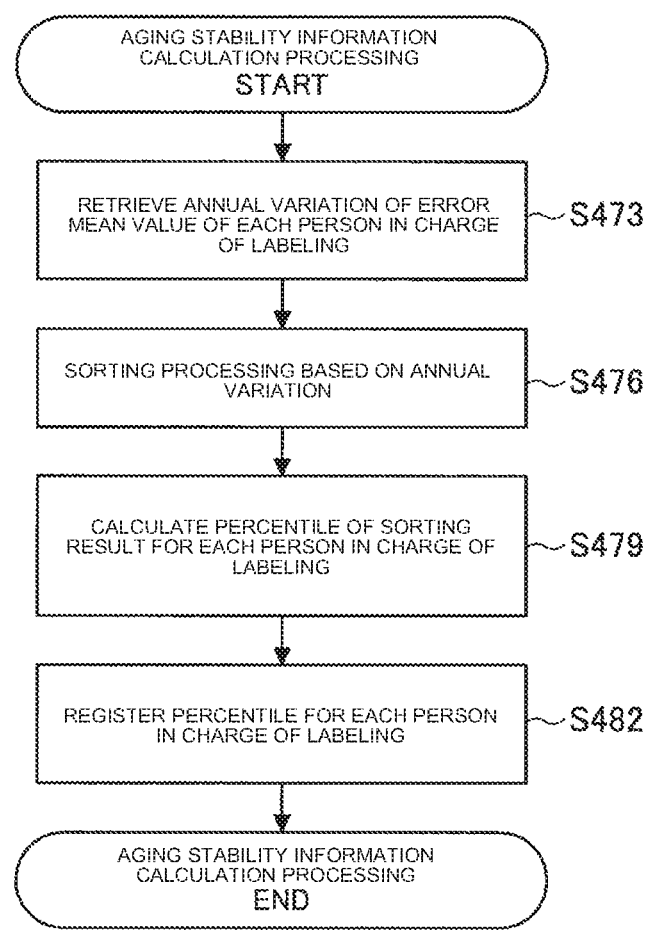
FIG. 30 is a flowchart illustrating an example of a procedure of aging stability information calculation processing according to the present embodiment.

FIG. 30 is a flowchart illustrating an example of a procedure of aging stability information calculation processing. As illustrated in FIG. 30, the profile generation unit 110 retrieves an annual variation of the error mean value of each person in charge of labeling, and creates a list of the annual variation of the error mean value (Step S473).

Next, the profile generation unit 110 performs sorting processing based on the annual variation (that is, sorts the list based on the annual variation of a mean error) (Step S476), and calculates a percentile of a sorting result for each person in charge of labeling (Step S479). For example, the profile generation unit 110 causes a numerical value obtained by dividing a rank in the list by the number of all users to be the percentile.

The profile generation unit 110 then registers the percentile for each person in charge of labeling (Step S482).

5. CONCLUSION

As described above, with the information processing system according to the embodiment of the present disclosure, the person in charge of labeling can be evaluated based on the process of generating the data set as quality improvement of the data set used for machine learning.

The preferred embodiment of the present disclosure has been described above in detail with reference to the attached drawings, but the present technique is not limited thereto. A person ordinarily skilled in the art of the present disclosure may obviously conceive various examples of variations or modifications within the scope of the technical idea described in CLAIMS, and these variations or modifications are assumed to be encompassed by the technical scope of the present disclosure as a matter of course.

For example, it is possible to create a computer program for causing hardware such as a CPU, a ROM, and a RAM incorporated in the information processing device 1 described above to exhibit the function of the information processing device 1. A computer-readable storage medium storing the computer program is also provided.

The effects described herein are merely explanation or examples, and are not limitations. That is, the technique according to the present disclosure may exhibit other effects that are conceivable by those skilled in the art based on the description herein in addition to the effects described above, or in place of the effects described above.

The present technique can also take configurations as follows.

(1)
An information processing device comprising:
a control unit configured to
add a temporary label to a predetermined position on input data for machine learning,
generate label data in accordance with input of correction of the temporary label by a person in charge of labeling, and
calculate labeling accuracy of the person in charge of labeling based on a comparison between label data corrected by the person in charge of labeling and correct-answer label data that is acquired in advance.

(2)
The information processing device according to (1), wherein the control unit generates a profile screen that presents information of the labeling accuracy.

(3)
The information processing device according to (1) or (2), wherein
the control unit
adds a temporary label based on machine learning, and performs additional learning of the machine learning to add a temporary label again based on label data that is generated in accordance with the input of correction.

(4)
The information processing device according to (3), wherein the control unit applies a predetermined weight to the label data that is generated in accordance with the input of correction, and performs additional learning of the machine learning.

(5)
The information processing device according to any one of (1) to (4), wherein the control unit outputs the label data that is generated in accordance with the input of correction to a requestor.

(6)
The information processing device according to any one of (1) to (5), wherein the control unit selects label data to be output to a requestor in accordance with the labeling accuracy of the person in charge of labeling.

(7)
The information processing device according to any one of (1) to (6), wherein the control unit calculates the labeling accuracy based on an error between the label data corrected by the person in charge of labeling and the correct-answer label data that is acquired in advance.

(8)
The information processing device according to any one of (1) to (6), wherein the control unit sets predetermined priority to collected labeling target data, and sorts an object list to be presented as a labeling target to the person in charge of labeling.

(9)
The information processing device according to (8), wherein the control unit sets high priority to an incorrect-answer image, or an image having a high abnormal value using a machine learning appliance that has performed learning in advance.

(10)
An information processing method comprising pieces of processing performed by a processor, the processing comprising:
temporary label addition processing of adding a temporary label to a predetermined position on input data for machine learning;
processing of generating label data in accordance with input of correction of the temporary label by a person in charge of labeling; and
processing of comparing label data corrected by the person in charge of labeling with correct-answer label data that is acquired in advance, and calculating labeling accuracy of the person in charge of labeling.

(11)
A computer program for causing a computer to function as a control unit, the control unit configured to perform:
temporary label addition processing of adding a temporary label to a predetermined position on input data for machine learning;
processing of generating label data in accordance with input of correction of the temporary label by a person in charge of labeling; and
processing of comparing label data corrected by the person in charge of labeling with correct-answer label data that is acquired in advance, and calculating labeling accuracy of the person in charge of labeling.

REFERENCE SIGNS LIST

1 Information processing device
10 Control unit
11 Communication unit
12 Input unit
13 Output unit
14 Storage unit
100 Correct-answer label data acquisition unit
101 Estimation appliance learning unit
102 Labeling target data acquisition unit
103 Object list generation unit
104 Prelabel addition unit
105 Priority estimation unit
106 Object list sort unit
107 Object list presentation unit
108 Label addition unit
109 Labeling accuracy calculation unit
110 Profile generation unit
111 Label data weight estimation unit
112 Output label data selection unit 120 Profile information acquisition unit
1051 Unnecessary image estimation unit
1052 Abnormality estimation unit
1053 Duplicate data detection unit
1054 Data quality estimation unit

The invention claimed is:

1. An information processing device, comprising:
one or more computer processors configured to:
automatically add, based on an output of a learned machine learning algorithm, a temporary label of a plurality of temporary labels to a specific position on input data;
generate a confidence score for each temporary label of the plurality of temporary labels, wherein the confidence score indicates a reliability of the added temporary label to the specific position;
display a first number of temporary labels of the plurality of temporary labels which have low confidence scores among the plurality of temporary labels;
receive an input of correction for the first number of temporary labels from a person in charge of labeling;
generate label data for each temporary label of the first number of temporary labels based on the input of correction by the person in charge of labeling;
acquire correct-answer label data associated with the input data;
compare the generated label data with the acquired correct-answer label data;
calculate a labeling accuracy of the person in charge of labeling based on the comparison between the generated label data and the acquired correct-answer label data;
relabel the temporary label of each temporary label of the first number of temporary labels with the generated label data based on the calculated labeling accuracy;
apply a specific weight to the generated label data based on the input of correction and the labeling accuracy; and
perform an additional learning process for the learned machine learning algorithm, to learn the generated label data, based on the specific weight of the generated label data.

2. The information processing device according to claim 1, wherein the one or more computer processors is further configured to generate a profile screen that presents information associated with the labeling accuracy.

3. The information processing device according to claim 1, wherein the one or more computer processors is further configured to output the generated label data to a requestor.

4. The information processing device according to claim 1, wherein the one or more computer processors is further configured to select the generated label data, to be output to a requestor, based on the labeling accuracy.

5. The information processing device according to claim 1, wherein the one or more computer processors is further configured to calculate the labeling accuracy based on an error between the generated label data and the acquired correct-answer label data.

6. The information processing device according to claim 1, wherein the one or more computer processors is further configured to:
set a specific priority to each of the input data; and
sort an object list to be presented, as a labeling target, to the person in charge of labeling.

7. The information processing device according to claim 6, wherein the one or more computer processors is further configured to set a priority to at least one of an incorrect-answer image, or an image having a high abnormal value using the learned machine learning algorithm.

8. An information processing method, comprising:
automatically adding, based on an output of a learned machine learning algorithm, a temporary label of a plurality of temporary labels to a specific position on input data;
generating a confidence score for each temporary label of the plurality of temporary labels, wherein the confidence score indicates a reliability of the added temporary label to the specific position;
displaying a first number of temporary labels of the plurality of temporary labels which have low confidence scores among the plurality of temporary labels;
receiving an input of correction for the first number of temporary labels from a person in charge of labeling;
generating label data for each temporary label of the first number of temporary labels based on the input of correction by the person in charge of labeling;
acquiring correct-answer label data associated with the input data;
comparing the generated label data corrected with the acquired correct-answer label data;
calculating a labeling accuracy of the person in charge of labeling based on the comparison between the generated label data and the acquired correct-answer label data;
relabeling the temporary label of each temporary label of the first number of temporary labels with the generated label data based on the calculated labeling accuracy;
applying a specific weight to the generated label data based on the input of correction and the labeling accuracy; and
performing an additional learning process for the learned machine learning algorithm, to learn the generated label data, based on the specific weight of the generated label data.

9. A non-transitory computer-readable medium having stored thereon, computer-executable instructions which, when executed by a computer, cause the computer to execute operations, the operations comprising:
automatically adding, based on an output of a learned machine learning algorithm, a temporary label of a plurality of temporary labels to a specific position on input data;
generating a confidence score for each temporary label of the plurality of temporary labels, wherein the confidence score indicates a reliability of the added temporary label to the specific position;
displaying a first number of temporary labels of the plurality of temporary labels which have low confidence scores among the plurality of temporary labels;
receiving an input of correction for the first number of temporary labels from a person in charge of labeling;
generating label data for each temporary label of the first number of temporary labels based on the input of correction by the person in charge of labeling;
acquiring correct-answer label data associated with the input data;
comparing the generated label data corrected with the acquired correct-answer label data;
calculating a labeling accuracy of the person in charge of labeling based on the comparison between the generated label data and the acquired correct-answer label data;

relabeling the temporary label of each temporary label of the first number of temporary labels with the generated label data based on the calculated labeling accuracy;

applying a specific weight to the generated label data based on the input of correction and the labeling accuracy; and performing an additional learning process for the learned machine learning algorithm, to learn the generated label data, based on the specific weight of the generated label data.

* * * * *